(12) United States Patent
Kihara et al.

(10) Patent No.: US 7,393,447 B2
(45) Date of Patent: Jul. 1, 2008

(54) APPARATUS, METHOD FOR ENRICHMENT OF THE HEAVY ISOTOPES OF OXYGEN AND PRODUCTION METHOD FOR HEAVY OXYGEN WATER

(75) Inventors: Hitoshi Kihara, Tokyo (JP); Hiroshi Tachibana, Tokyo (JP); Shigeru Hayashida, Tokyo (JP); Hiroshi Kawakami, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 482 days.

(21) Appl. No.: 10/989,687

(22) Filed: Nov. 15, 2004

(65) Prior Publication Data

US 2005/0129592 A1  Jun. 16, 2005

Related U.S. Application Data

(62) Division of application No. 09/689,297, filed on Oct. 11, 2000, now Pat. No. 6,835,287.

(30) Foreign Application Priority Data

Oct. 12, 1999  (JP) ................................. 11-290259

(51) Int. Cl.
*C25B 1/04* (2006.01)
*C25B 5/02* (2006.01)
*C01B 13/02* (2006.01)

(52) U.S. Cl. ...................... 205/628; 423/579; 423/580.2

(58) Field of Classification Search ............... 423/580.2, 423/579, 617, 630, 631, 632, 635; 205/628
See application file for complete search history.

(56) References Cited

U.S. PATENT DOCUMENTS

| 1,957,818 | A |   | 5/1934  | Carney |
|---|---|---|---|---|
| 2,780,526 | A | * | 2/1957  | Fleck ......................... 205/627 |
| 2,895,803 | A | * | 7/1959  | Spevack .................. 423/580.2 |
| 3,625,835 | A |   | 12/1971 | Tervoort et al. |
| 3,969,447 | A |   | 7/1976  | Glitsch et al. |
| 4,173,620 | A |   | 11/1979 | Shimizu |
| 4,191,626 | A | * | 3/1980  | Hammerli et al. ........... 204/266 |
| 4,221,774 | A | * | 9/1980  | Spevack .................. 423/580.2 |
| 4,315,802 | A |   | 2/1982  | Tsao |
| 4,399,120 | A | * | 8/1983  | Cheung ................... 423/647.7 |
| 4,559,070 | A |   | 12/1985 | Sweet |
| 4,604,247 | A |   | 8/1986  | Chen et al. |

(Continued)

FOREIGN PATENT DOCUMENTS

GB         867848         5/1961

(Continued)

*Primary Examiner*—Wayne A. Langel
(74) *Attorney, Agent, or Firm*—Kolisch Hartwell, P.C.

(57) ABSTRACT

An apparatus comprising first to third columns, wherein the outlet of a first column reboiler and the inlet of a second column condenser are connected by a first introduction conduit, and the outlet of a second distillation column reboiler and the inlet of a third column condenser are connected by a second introduction conduit, and additionally the outlet of the second column condenser and the inlet of the first column reboiler are connected by a first return conduit, and the outlet of the third column condenser and the inlet of the second column reboiler are connected by a second return conduit.

8 Claims, 14 Drawing Sheets

U.S. PATENT DOCUMENTS

| | | |
|---|---|---|
| 4,759,786 A | 7/1988 | Atkinson et al. |
| 4,788,051 A | 11/1988 | Spevack |
| 5,242,550 A | 9/1993 | Asselineau |
| 5,288,370 A | 2/1994 | Asselineau |
| 5,953,936 A | 9/1999 | Agrawal et al. |
| 6,321,565 B1 | 11/2001 | Kihara et al. |
| 6,461,583 B1 * | 10/2002 | Hayashida et al. .......... 423/579 |
| 6,835,287 B1 * | 12/2004 | Kihara et al. ............... 202/154 |

FOREIGN PATENT DOCUMENTS

| | | |
|---|---|---|
| JP | 07148419 | 6/1995 |
| WO | WO00/27509 | 5/2000 |
| WO | WO 00/27509 * | 5/2000 |

* cited by examiner

APPARATUS, METHOD FOR ENRICHMENT OF THE HEAVY ISOTOPES OF OXYGEN AND PRODUCTION METHOD FOR HEAVY OXYGEN WATER

CROSS REFERENCE TO RELATED APPLICATION

This application is a divisional application of U.S. patent application Ser. No. 09/689,297 filed Oct. 11, 2000, now U.S. Pat. No. 6,835,287 titled "Apparatus, Method For Enrichment Of The Heavy Isotopes Of Oxygen And Production Method For Heavy Oxygen Water" hereby incorporated by reference.

BACKGROUND OF THE INVENTION

The present invention relates to an apparatus for separation/enrichment of isotopes of a uniform compound, and to an apparatus and method for obtaining heavy oxygen water in which the oxygen isotopes $^{17}O$ and $^{18}O$ (referred to as heavy oxygen isotopes) within the water molecules have been enriched. More specifically, the present invention relates to a method of producing water enriched in the oxygen isotopes of $^{17}O$ and $^{18}O$ in which oxygen is enriched in $^{16}O^{17}O$, $^{16}O^{18}O$, $^{17}O^{17}O$, $^{17}O^{18}O$, and $^{18}O^{18}O$ by cryogenic distillation of oxygen, and then converted to water, and to a method of producing water which is further enriched in the oxygen isotopes of $^{17}O$ and $^{18}O$ in which oxygen is enriched in $^{16}O^{17}O$, $^{16}O^{18}O$, $^{17}O^{17}O$, $^{17}O^{18}O$, and $^{18}O^{18}O$ by cryogenic distillation of oxygen, and then converted to water which is then subject to water distillation.

DESCRIPTION OF THE RELATED ART

In the distillation operation in a system in which the relative vapor pressure (separation factor) is extremely small, as represented by the process of distillation separation/enrichment of isotopes, an extremely large theoretical number of plates is necessary.

In this case, generally, packed columns are used in order to suppress pressure loss within the column, however, it is not uncommon for the required packing height therefore to reach several hundred meters.

Consequently, actual apparatuses are constructed with a plurality of distillation columns connected by piping, the whole of which comprises a single distillation column group.

FIG. 18 shows an example of an apparatus provided with three distillation columns with each of the columns (first to third columns 61, 62, and 63) connected.

In this apparatus, the liquid which accumulates in the bottom of the first distillation column 61 and the second distillation column 62 is supplied by means of pumps 61a and 62a to the tops of second distillation column 62 and third distillation column 63 respectively as reflux liquid. Vapor which is drawn off from the top of the second column 62 and the third column 63 is returned to the bottoms of the first column 61 and the second column 62 respectively as ascending vapor.

In this process, the supply of the process fluid from the first column 61 to the second column 62 and from the second column 62 to the third column 63 is carried out by liquid pumps 61a and 62a, but the return of the process liquid from the second column 62 to the first column 61, and from the third column 63 to the second column 62 occurs due to the pressure differences in the vapor. Therefore, the pressure within the distillation columns must be successively higher from the first column 61 toward the third column 63. In general, since the relative vapor pressure (separation factor) is smaller the higher the operating pressure of the distillation column, distillation efficiency is lower in the second column 62 than the first column 61, and lower in the third column 63 than in the second column 62.

In addition, in general, as in isotope separation processes, when the relative vapor pressure of the separation components is extremely small and the packing height is extremely large, the time (hereinafter referred to as the start-up time) from the start up of the apparatus until it becomes possible to collect the stipulated amount (the product amount extracted in accordance with the specifications, or the planned value) may take from several months to several years. Consequently, reduction of the start-up time has hitherto been an issue.

The start-up time is heavily dependent on the process liquid hold-up within the apparatus, and the greater the amount thereof, the longer the start-up time is.

FIG. 19 shows a distillation process having a the same functions as the apparatus shown in FIG. 18, and each column 71, 72, and 73 are provided with condensers 5, 7 and 9, and reboilers 6, 8, and 10. These are apparatuses which are generally used in processes comprising a plurality of distillation columns. The diameter of the distillation columns becomes smaller from the column 71 to which the starting material is fed, to the column 73, which is downstream from column 71.

Thereby, it is possible to reduce the process liquid hold-up within the apparatus, and to shorten the start-up time.

However, even when using this type of apparatus, since the pressure within the distillation column increases from the first column 71 to the third column 73, in the same way as with the apparatus shown in FIG. 18, the distillation efficiency is lower in the second column 72 than in the first column 71, and is lower in the third column 73 than in the second column 72.

Reductions in the distillation efficiency are lead to increases in the necessary packing height of the distillation column and to increases in the process liquid hold up. Therefore, they are not desirable from the point of view of shortening the start-up time.

In addition, in conventional isotope distillation processes, columns packed using unstructured packing have been used. In general, unstructured packing has a larger specific surface area compared with structured packing. However, the liquid hold-up within the distillation column is 10 to 20% of the volume of the column, and in some cases exceeds 20%, and this is a cause of prolonged start-up time.

SUMMARY OF THE INVENTION

In consideration of the above-mentioned circumstances, the present invention has as an object the provision of an apparatus comprising a plurality of distillation columns and with which the start-up time is shorter than with conventional apparatuses.

In order to overcome the above-mentioned problems, the apparatus of the present invention is an apparatus for separation of a vapor or liquid mixture comprising a plurality of distillation columns (a first column to an $n^{th}$ column) constructed in a cascade comprising introduction conduits which connect the bottom of a $k^{th}$ column ($1 \leq k \leq (n-1)$) or an outlet of a reboiler provided in the vicinity of the bottom of the $k^{th}$ column to the top of a $(k+1)^{th}$ column, an inlet of a condenser provided in the vicinity of the top of the $(k+1)^{th}$ column, or the middle section of the $(k+1)^{th}$ column, and return conduits which connect an outlet of the condenser of the $(k+1)^{th}$ column to an inlet of the reboiler provided in the vicinity of the bottom of the $k^{th}$ column, the bottom of the $k^{th}$ column, or the middle section of the $k^{th}$ column.

In addition, the apparatus of the present invention is an apparatus for separation of a vapor or liquid mixture comprising a plurality of components using a plurality of distillation columns (a first column to an $n^{th}$ column) constructed in a cascade comprising introduction conduits which connect the bottom of a $k^{th}$ column ($1 \leq k \leq (n-1)$) or an outlet of a reboiler provided in the vicinity of the bottom of the $k^{th}$ column to the top of a $(k+1)^{th}$ column, an inlet of a condenser provided in the vicinity of the top of the $(k+1)^{th}$ column, or the middle section of the $(k+1)^{th}$ column, and return conduits which connect the top of the $(k+1)^{th}$ column, or the inlet of the condenser provided in the vicinity of the top of the $(k+1)^{th}$ column to the bottom of the $k^{th}$ column or the middle section of the $k^{th}$ column via a blower.

In addition, in the apparatus of the present invention, at least one of the distillation columns is a packed column in which structured packing (promoting-fluid-dispersion type structured packing or non-promoting-fluid-dispersion type structured packing) is used, or a wetted wall column.

In addition, the apparatus of the present invention comprises an isotope scrambler, an extraction conduit which connects at least one section of said apparatus to an inlet of the isotope scrambler; and a return conduit which connects at least one section of said apparatus to an outlet of the isotope scrambler.

In addition, the apparatus of the present invention comprises a hydrogenation device at a stage after the $n^{th}$ column.

In addition, the apparatus of the present invention is provided with a hydrogenation device at a stage after the $n^{th}$ column, and another of the above-mentioned plurality of distillation columns (a first column to an $n^{th}$ column) constructed in a cascade, at the above-mentioned stage.

The method of enrichment of oxygen isotopes of the present invention is one in which an oxygen-starting material containing heavy oxygen isotopes is enriched by means of a cascade process using a plurality of distillation columns (a first column to an $n^{th}$ column) comprising supplying at least a part of the vapor from the bottom of a $k^{th}$ ($1 \leq k \leq (n-1)$) column or an outlet of a reboiler provided in the vicinity of the bottom of the $k^{th}$ column to the top of a $(k+1)^{th}$ column, an inlet of a condenser provided in the vicinity of the top of the $(k+1)^{th}$ column, or a middle section of the $(k+1)^{th}$ column; returning at least a part of the liquid from the top of the $(k+1)^{th}$ column or an outlet of the condenser of the $(k+1)^{th}$ column to an inlet of a reboiler of the $k^{th}$ column, the bottom of the $k^{th}$ column, or the middle section of the $k^{th}$ column; and thereby carrying out enrichment in at least one type of oxygen molecule of $^{16}O^{17}O$, $^{16}O^{18}O$, $^{17}O^{17}O$, $^{17}O^{18}O$, and $^{18}O^{18}O$ which contain heavy oxygen isotopes.

A method of enrichment of oxygen isotopes in which an oxygen-starting material containing heavy oxygen isotopes is enriched by means of a cascade process using a plurality of distillation columns (a first column to an $n^{th}$ column) comprising supplying at least a part of the vapor from the bottom of a $k^{th}$ ($1 \leq k \leq (n-1)$) column or an outlet of a reboiler provided in the vicinity of the bottom of the $k^{th}$ column to the top of a $(k+1)^{th}$ column, an inlet of a condenser provided in the vicinity of the top of the $(k+1)^{th}$ column, or a middle section of the $(k+1)^{th}$ column, pressurizing at least a part of a vapor drawn off from the top of a $(k+1)^{th}$ column or a vapor from an inlet of the condenser of the $(k+1)^{th}$ column by means of a blower, and then returning a said vapor to the bottom of the $k^{th}$ column or the middle section of the $k^{th}$ column, and thereby carrying out enrichment in at least one type of oxygen molecule of $^{16}O^{17}O$, $^{16}O^{18}O$, $^{17}O^{17}O$, $^{17}O^{18}O$, and $^{18}O^{18}O$, which contain heavy oxygen isotopes.

In addition, the method of the present invention is a method for enrichment in isotopes of oxygen comprising subjecting an oxygen isotope enriched material enriched by means of the above mentioned enrichment method to oxygen isotope scrambling to obtain an enriched product having an even higher concentration of at least one type of the above-mentioned oxygen molecules which contain heavy oxygen isotopes.

In addition, the method of the present invention is a method for enrichment in isotopes of oxygen comprising subjecting an oxygen-isotope enriched material enriched by means of the above mentioned method of enrichment to oxygen isotope scrambling, to obtain an enriched material having a higher concentration of at least one type of said oxygen molecules which contain heavy oxygen isotopes; and obtaining an enriched product having an even higher concentration of at least one type of the above mentioned oxygen molecules which contain heavy oxygen isotopes by means of conducting the above mentioned method of enrichment again on said enriched material.

In addition, the method of producing heavy oxygen water of the present invention comprises obtaining an enriched material which has been enriched in at least one component from oxygen molecules which contain heavy oxygen isotopes by means of cryogenic distillation of an oxygen starting material which contains heavy oxygen isotopes using the above mentioned apparatus; obtaining water containing heavy oxygen water corresponding to said enriched material by adding hydrogen to said enriched material. Thereafter, this heavy oxygen water is further enriched using the above mentioned apparatus.

In addition, the method of the present invention is a method of producing heavy oxygen water in which a water starting material containing heavy oxygen water is enriched by means of a cascade process using a plurality of distillation columns comprising supplying at least a part of the water vapor from the bottom of a $k^{th}$ ($1 \leq k \leq (n-1)$) column or an outlet of a reboiler provided in the vicinity of the bottom of the $k^{th}$ column to the top of a $(k+1)^{th}$ column, an inlet of a condenser provided in the vicinity of the top of the $(k+1)^{th}$ column, or a middle section of the $(k+1)^{th}$ column, introducing at least a part of the water from the top of the $(k+1)^{th}$ column, or an outlet of the condenser of the $(k+1)^{th}$ column into an inlet of a reboiler of the $k^{th}$ column, the bottom of the $k^{th}$ column, or the middle section of the $k^{th}$ column, and thereby carrying out enrichment in at least one type of heavy oxygen water of $H_2^{17}O$, $H_2^{18}O$, $D_2^{17}O$, $D_2^{18}O$, $DH^{17}O$ and $DH^{18}O$, which contain heavy oxygen isotopes.

In the present invention, it is possible to return a part of the liquid drawn off from the condenser of the $(k+1)^{th}$ column via a return conduit. More particularly, an introduction conduit may connect the bottom of the kth column ($1 \leq k \leq (n-1)$) or an outlet of a reboiler provided in the vicinity of the $k^{th}$ column to the top of the $(k+1)^{th}$ column. Alternatively, the introduction conduit may connect to the middle section of the $(k+1)^{th}$ column. Similarly, a return conduit may connect the outlet of the condenser of the $(k+1)^{th}$ column to the inlet of a reboiler provided in the vicinity of the bottom of the $k^{th}$ column, the bottom of the $k^{th}$ column, or the middle section of the $k^{th}$ column.

For this reason, it is possible to set the pressure in each column lower than in conventional apparatuses, to increase the relative vapor pressure between each of the isotopes within each column, and thereby it is possible to improve distillation efficiency.

Consequently, it is possible to reduce the height of the packing within each column, and it is possible to shorten the start-up time. In addition, it is possible to obtain a product having a higher concentration of heavy oxygen isotopes.

In addition, the liquid hold-up volume is reduced, and this makes it possible for the start-up time of the device to be reduced even further.

DESCRIPTION OF THE EMBODIMENTS

Figure 1:
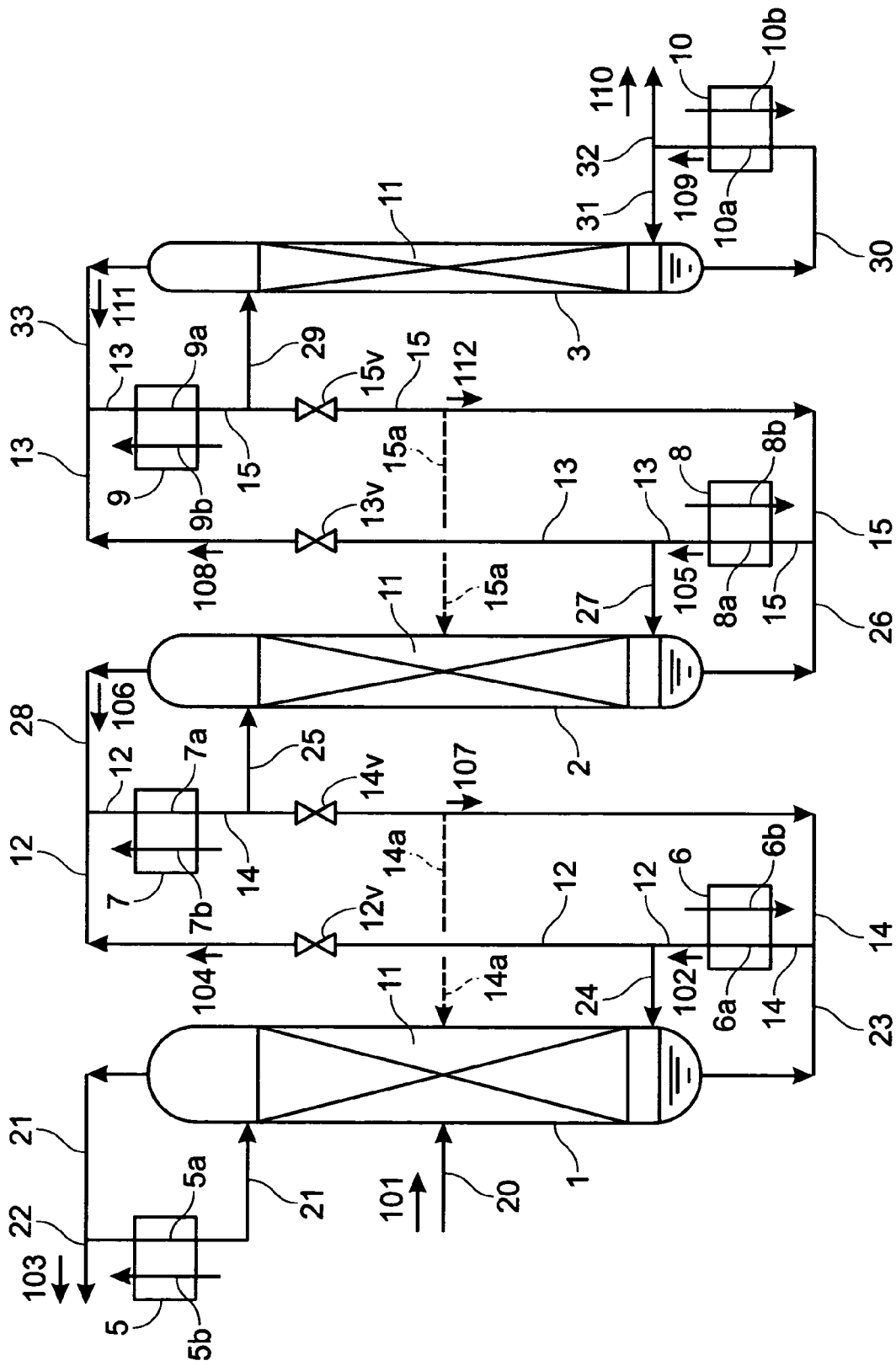
FIG. 1 is a schematic structural diagram showing an example of a first embodiment of the apparatus of the present invention.

FIG. 1 shows a first embodiment of the apparatus of the present invention. The apparatus shown here is equipped with three distillation columns, a first column 1, a second column 2, and a third column 3, constructed in a cascade.

Here, "constructed in a cascade" means that the distillation columns are connected in such a way that the enriched product of one column can be further enriched in the next distillation column, and then can be further enriched again in the next distillation column, and all the distillation columns together constructed in this way are referred to as a cascade process.

In addition, in the figure, the path indicated by the broken line is a modification of the present embodiment, and is not included in the apparatus of the present embodiment.

A first condenser 5, a second condenser 7, and a third condenser 9 which cool and liquefy at least a part of the vapor drawn off from the tops of the first column 1, the second column 2, and the third column 3 respectively are provided in the vicinity of the tops of these first to third columns 1, 2, and 3.

Condensers 5, 7 and 9 have first conduits 5a, 7a, and 9a, respectively, into which vapor drawn off from the tops of column 1, 2, and 3, respectively, is introduced, and second conduits 5b, 7b, and 9b through which a medium for heat exchange flows, and are arranged in such a way that the above-mentioned drawn-off vapor can be cooled and liquefied by means of heat exchange with the medium for heat exchange.

As condensers 5, 7, and 9, it is preferable to use a plate fin type condenser.

In the example shown in the Figures, condensers 5, 7, and 9 are provided outside of the columns 1, 2, and 3, however, they may also be provided within the tops of the columns 1, 2, and 3.

A first reboiler 6, a second reboiler 8, and a third reboiler 10 which heat and vaporize at least a part of the liquid drawn off from the bottom of the columns 1, 2, and 3, respectively, are provided in the vicinity of the bottoms of the columns 1, 2, and 3.

Reboilers 6, 8, and 10 have first conduits 6a, 8a, and 10a, respectively, into which liquid drawn off from the columns 1, 2, and 3 is introduced, and second conduits 6b, 8b, and 10b through which a medium for heat exchange flows, and are arranged in such a way that the above-mentioned drawn-off liquid can be heated and vaporized by means of heat exchange with the medium for heat exchange.

As reboilers 6, 8, and 10, it is preferable to use a plate fin type reboiler. In addition, the position of installation of these reboilers is such that the amount of liquid which accumulates at the bottom of each column is reduced to a minimum range within which operation is possible in order to reduce the liquid hold up.

In the example shown in the Figures, the reboilers 6, 8, and 10 are provided outside of columns 1, 2, and 3, however, they may also be provided within the bottoms of columns 1, 2, and 3. In that situation, a coil type reboiler is also suitable.

In the distillation column of the present invention, the outlet (the outlet of first conduit 6a) of reboiler 6 of the first column which is provided in the vicinity of the bottom of the first column 1, and the inlet of the first conduit 7a of the condenser 7 of the second column which is provided in the vicinity of the top of the second column, are connected by a first introduction conduit 12 via a valve 12v.

In the same way, the outlet (outlet of first conduit 8a) of the reboiler 8 of the second column, and the inlet (the inlet of the first conduit 9a) of the condenser 9 of the third column are connected by second introduction conduit 13 via valve 13v.

In addition, the outlet (the outlet of first conduit 7a) of the condenser 7 of the second column and the inlet (the inlet of the first conduit 6a) of the reboiler 6 of the second column are connected by means of the first return conduit 14 via valve 14v.

In addition, the outlet (the outlet of first conduit 9a) of the condenser 9 of the third column and the inlet (the inlet of the first conduit 8a) of the reboiler 8 of the second column are connected by means of the second return conduit 15 via valve 15v.

The position of installation of valve 14v and valve 15v is in the upper part (close to the condenser) of return conduits 14 and 15, at a position where it is possible to obtain a head pressure with which the pressure difference between the $k^{th}$ columns and the $(k+1)^{th}$ columns in a cascade series of a plurality of columns mentioned below is a pressure difference between each column such that this cascade system functions.

The insides of the first to third columns 1, 2, and 3 are packed with structured packing 11.

Non-promoting-fluid-dispersion type structured packing and/of promoting-fluid-dispersion type structured packing can be suitably used as structured packing.

Non-promoting-fluid-dispersion type structured packing has a shape and structure with which the liquid descending within the distillation column and the vapor ascending within the distillation column flow in opposition to one another along the surface of the packing, and vapor-liquid contact occurs without the promotion of mixing of the liquid and vapor in the horizontal cross-section direction with respect to the column axis. As examples, a packing material in which a large number of plates formed from aluminum, copper, alloy of aluminum and copper, stainless steel, various types of plastic, or the like are positioned parallel to the direction of the main flow (the direction of the column axis) can be mentioned.

Here, the main flow indicates the descending liquid and the ascending vapor which occurs along the direction of the column axis within the distillation column, therefore, it indicates the flow in the direction of the column axis with respect to the flow of mass transfer which is produced at the liquid-vapor interface (in other words, the boundary layer) at the surface of the packing.

Figure 2:
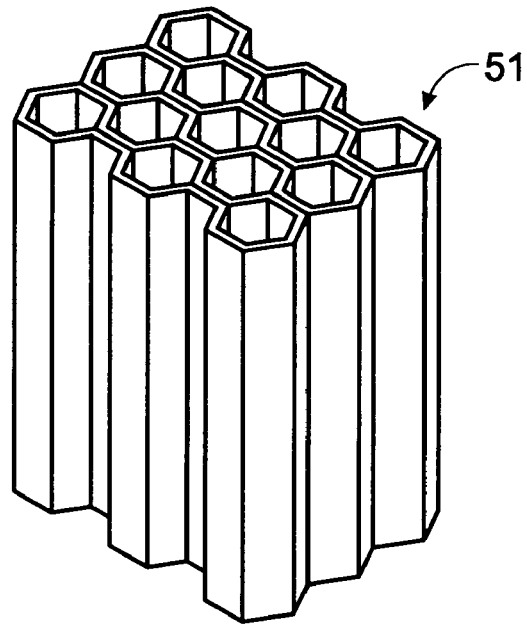
FIG. 2 is a perspective view showing an example of non-promoting-fluid-dispersion type structured packing which can be used in the apparatus of the present invention.
Figure 3:
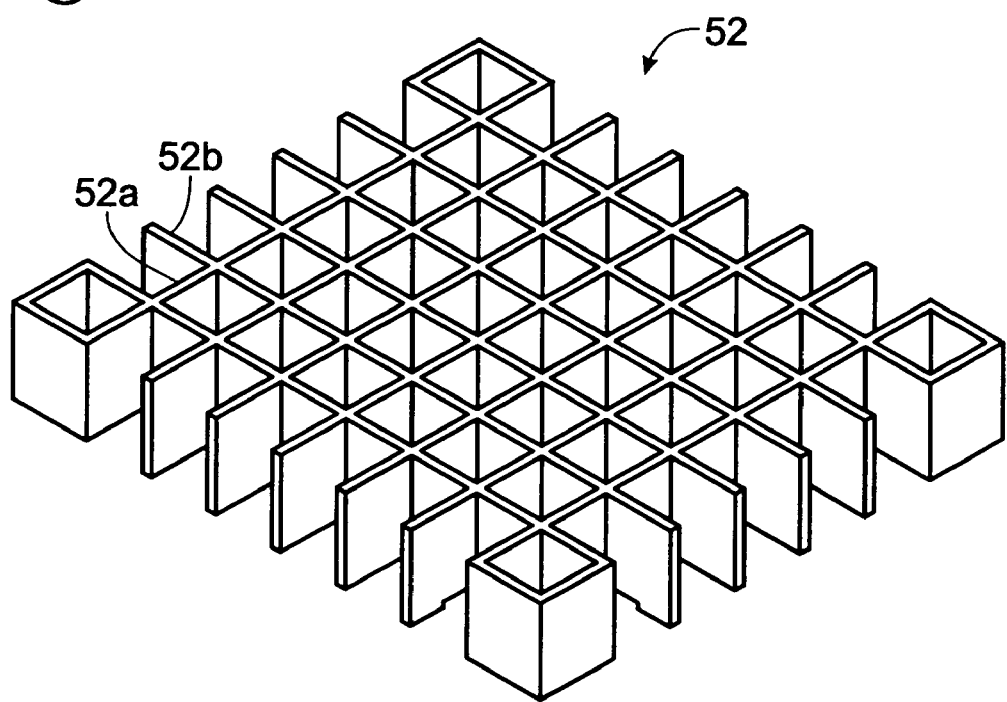
FIG. 3 is a perspective view showing another example of non-promoting-fluid-dispersion type structured packing which can be used in the apparatus of the present invention

Examples of typical non-promoting-fluid-dispersion type packing materials are shown in FIG. 2 and FIG. 3.

The non-promoting-fluid-dispersion type structured packing 51 shown in FIG. 2 has a honeycomb structure comprising plates parallel to the direction of the axis of the column.

In addition, the non-promoting-fluid-dispersion type structured packing 52 shown in FIG. 3 is a lattice structure comprising a plurality of mutually parallel plates 52a and a plurality of plates 52b which are arranged at right angles with respect to the plates 52a, and this lattice structure is positioned along the direction of the column axis.

Promoting-fluid-dispersion type structured packing has a shape and structure with which vapor-liquid contact occurs mainly on the surface of the above mentioned structured packing between the liquid descending within the distillation column and the vapor ascending within the distillation column, at which time the liquid and the vapor flow in opposition to one another on the surface of the above mentioned structured packing in the direction of the main flow, which is along the direction of the column axis, and, at the same time, mixing of the liquid and/or the vapor in a direction at right angles to the above mentioned main flow direction is promoted and vapor-liquid contact occurs. These are called structured packing or regular packing in which thin plates of aluminum, copper, aluminum-copper alloy, stainless steel, various plastics, or the like are formed into a variety of regular forms, and then made into a laminated block.

Figure 4:
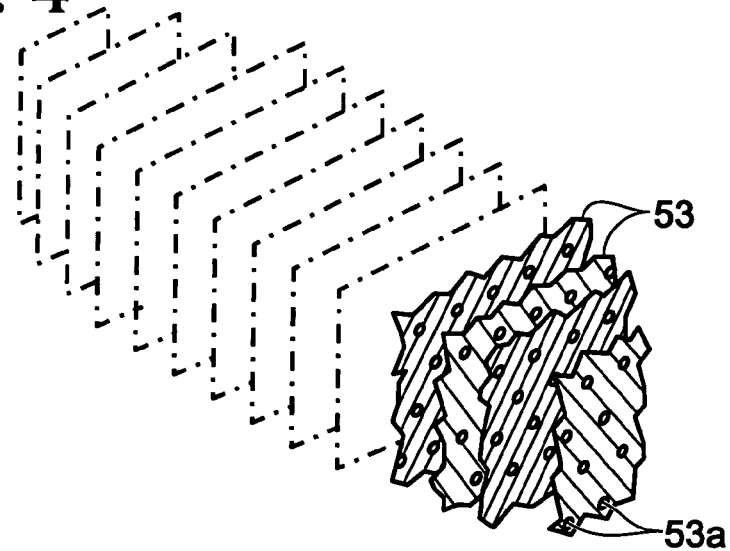
FIG. 4 is a perspective view showing an example of promoting-fluid-dispersion type structured packing which can be used in the present invention.
Figure 5:
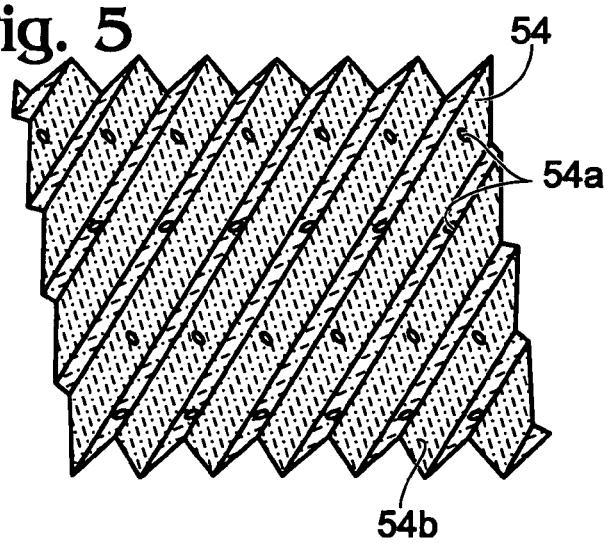
FIG. 5 is a perspective view showing another example of promoting-fluid-dispersion type structured packing which can be used in the present invention.
Figure 6:
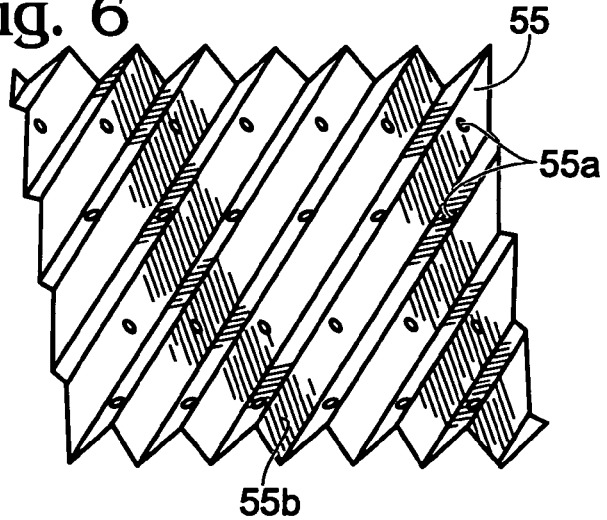
FIG. 6 is a perspective view showing yet another example of promoting-fluid-dispersion type structured packing which can be used in the present invention.

Examples of typical promoting-fluid-dispersion type packing materials are shown in FIG. 4 to FIG. 6.

In the promoting-fluid-dispersion type structured packing 53 shown in FIG. 4, a plurality of wave-shaped thin plates are disposed parallel to the column axis and made into the form of a block by layering the plates so that they come into contact with one another. The wave-shaped grooves in each of the thin plates are inclined with respect to the column axis, and neighboring wave-shaped thin plates are disposed so that the direction of their wave-shaped grooves intersects one another. In addition, a plurality of holes 53a are provided in the thin plates. When the thin plates are disposed perpendicular to the horizontal plane, the holes are provided with an interval of spacing therebetween and form a plurality of rows along a direction which is at right angles to the column axis.

FIG. 5 shows an example of a structural unit of another promoting-fluid-dispersion type structured packing. In the promoting-fluid-dispersion type structured packing 54 shown here, a thin plate is molded by being pressed into a wave shape to form wave-shaped grooves. In addition, this example has the feature that extremely small wave-shaped grooves 54b are formed in the thin plates at a fixed angle with respect to the wave-shaped grooves. In addition, reference 54a indicates holes formed in the thin plate.

The promoting-fluid-dispersion type structured packing 55 shown in FIG. 6 has the feature of having a structure in which sections having extremely small grooves 55b formed at a fixed angle with respect to the wave-shaped grooves and smooth sections which do not have these extremely small grooves are provided alternately in the wave-shaped thin plate. In addition, the reference 55a indicates holes formed in the thin plates.

In the following, an example of a first embodiment of the method for enrichment of heavy oxygen isotopes of the present invention will be explained in detail using, as an example, a situation in which the apparatus shown in the above-mentioned FIG. 1, being an example of a first embodiment of the apparatus of the present invention, is used.

Firstly, an oxygen starting material is supplied to the inside of the first column 1 as first column feed 101 via a conduit 20 which serves as a feeding section connected to the first distillation column 1 at a position intermediate (intermediate position in the height direction).

The use of oxygen with high purity is preferred as the above mentioned oxygen vapor starting material. As the above mentioned oxygen of high purity, it is possible to use oxygen with a purity of 99.999% or higher, from which impurities such as argon, hydrocarbons, krypton, xenon, and fluorine compounds (such as perfluorocarbons) have been removed in advance. In particular, the use of an oxygen-starting material from which hydrocarbons have been removed is preferable from the point of view of safety.

The oxygen-starting material vapor supplied to the first column 1 is distilled by means of vapor-liquid contact with a reflux liquid (i.e., descending liquid) described below, when ascending within the first column 1 and passing through the packing 11.

The oxygen molecules in the oxygen starting material vapor which contain heavy oxygen isotopes (i.e. $^{16}O^{17}O$, $^{16}O^{18}O$, $^{17}O^{17}O$, $^{17}O^{18}O$, and $^{18}O^{18}O$) are more likely to condense due to their high boiling points, and in the process of vapor-liquid contact, the concentration of heavy oxygen isotopes in the descending liquid increases, and the concentration of heavy oxygen isotopes in the ascending vapor decreases.

The ascending vapor which reaches the top of the column and which has a reduced concentration of heavy isotopes is drawn off from the column 1 via conduit 21, and is divided into two parts. One part is introduced into the first conduit 5a of the first column condenser 5 where it exchanges heat with the medium for heat exchange flowing within the second conduit 5b, condenses, and is returned to the top of column 1 as reflux liquid. The other part is discharged out of the system via conduit 22 as exhaust vapor 103.

The reflux liquid returned to the top of the first column 1 flows down as descending liquid over the structure packing 11 while making vapor-liquid contact with the oxygen starting material vapor and the below mentioned ascending vapor which are ascending within the column 1, and reaches the bottom of the column 1.

In this process of vapor-liquid contact, the descending liquid becomes enriched in heavy oxygen isotopes (i.e. $^{16}O^{17}O$, $^{16}O^{18}O$, $^{17}O^{17}O$, $^{17}O^{18}O$, and $^{18}O^{18}O$), which have a greater tendency to liquefy.

Liquid which reaches the bottom of the first column 1 (hereinafter, the liquid which accumulates at the bottom of each of the columns is referred to as the "column bottom liquid") is drawn off from the column 1 through conduit 23, and is combined with the below mentioned first return liquid 107 in the above mentioned second return conduit 14, and then introduced into the first conduit 6a of the first column reboiler 6, where it is vaporized by heat exchange with the medium for heat exchange flowing within the second conduit 6b, and then drawn off from the reboiler 6 via the above mentioned first introduction conduit 12 as first column output vapor 102 which is an enriched material enriched in heavy oxygen isotopes.

A part of the first column output vapor 102 drawn off from reboiler 6 is returned to the lower part of the first column 1 via conduit 24, and rises within the column 1 as ascending vapor. The other part passes along first introduction conduit 12 as second column feed vapor 104, is combined with the below-mentioned second column top vapor 106, and introduced into the second column condenser 7. Here, it condenses, drawn off from the condenser 7 via the return conduit 14 and then divided into two parts.

One part of this divided condensed liquid passes along return conduit 14, through valve 14v, and is combined with the above-mentioned first column bottom liquid as return liquid 107, then it is introduced into the above-mentioned first column reboiler 6.

The return of this return liquid 107 occurs due to the weight of the condensed liquid itself which was liquefied in the condenser 7, flows out, and descends within conduit 14.

According to the method of the present embodiment, a part of the condensed liquid which has passed through the second column condenser 7 is returned to the first column reboiler 6 as first return liquid 107, and the return liquid under its own weight (head pressure) is introduced into the first column 1 by passing through the reboiler 6, therefore, the pressure within the top of the second column 2 can be made to be lower than the pressure of the bottom of the first column 1.

Therefore, it is possible for the above-mentioned second column feed vapor 104 to be sent to the second column 2 via the conduits 12 and 25.

The other part of the condensed liquid which was divided after being drawn off from the condenser 7 is supplied to the top of the second column 2 as second column reflux liquid or condensed second column feed vapor 104 through conduit 25, and flows down as descending liquid while making vapor-liquid contact with the ascending vapor within the second column 2 to reach the bottom of the second column 2.

In this process of vapor-liquid contact, the concentration of heavy isotopes within the ascending vapor decreases, while the descending liquid becomes further enriched in heavy oxygen isotopes.

The ascending vapor which reaches the top of the column and which has a reduced concentration of heavy isotopes is drawn off from column 2 via the conduit 28, and is combined as top vapor 106 with the second column feed vapor 104 in the above-mentioned introduction conduit 12.

The column bottom liquid of the second column 2 which is an enriched material enriched in heavy oxygen isotopes is drawn off from the second column via conduit 26, is combined with the below-mentioned second return liquid 112 in the above-mentioned second return conduit 15, and introduced into the second column reboiler 8. Here, after being vaporized, it is drawn off from the reboiler 8 via the above-mentioned second introduction conduit 13 as second column output vapor 105 which is enriched material enriched in heavy oxygen isotopes.

A part of the second column output vapor 105 drawn off from reboiler 8 is returned to the lower part of the column 2 via the conduit 27, and becomes ascending vapor which ascends within the second column 2. The other part passes along introduction conduit 13 as third column feed vapor 108, is combined with the below-mentioned third column top vapor 111, and is introduced into the third column condenser 9. Here, it condenses, is drawn off from the condenser 9 through second return conduit 15, and is then divided into two parts.

One part of this divided condensed liquid passes along second return conduit 15, through valve 15v, and is introduced into the above-mentioned second column reboiler 8 as second return liquid 112.

The return of this return liquid 112 occurs due to the weight of the condensed liquid itself which was liquefied in the condenser 9, drawn off, and descends within the conduit 15.

According to the method of the present embodiment, a part of the condensed liquid which has passed through the third column condenser 9 is returned to the second column reboiler 8 as second return liquid 112, and this return liquid under its own weight (head pressure) is introduced into the second column 2 by passing through the reboiler 8, therefore, the pressure within the top of the third column 3 can be made to be lower than the pressure of the bottom of the second column 2.

Therefore, it is possible for the above-mentioned third column feed vapor 108 to be sent to the third column 3 via the conduits 13 and 29.

The other part of the condensed liquid which was divided after being drawn off from the condenser 9 is supplied to the top of the third column 3 as third column reflux liquid 108 through conduit 29, and flows down as descending liquid while making vapor-liquid contact with the ascending vapor within the third column 3 to reach the bottom of the third column 3.

In this process of vapor-liquid contact, the concentration of heavy isotopes within the ascending vapor decreases, while the descending liquid becomes further enriched in-heavy oxygen isotopes.

The ascending vapor which reaches the top of the column and which has a reduced concentration of heavy isotopes is drawn off from column 3 via the conduit 33, and is combined as top vapor 111 with the third column feed vapor 108 in the above-mentioned introduction conduit 13, The column bottom liquid of the third column 3 which is an enriched material enriched in heavy oxygen isotopes is drawn off from the column 3 via conduit 30, and introduced into the third column reboiler 10. Here, after being vaporized, it is drawn off from the reboiler 10 as third column output vapor 109 which is enriched material enriched in heavy oxygen isotopes.

This third column output vapor 109 from the reboiler 10 is divided into two parts. One part is returned to the lower part of the column 3 via the conduit 31, and becomes ascending vapor which ascends within the third column 3. The other part passes along conduit 32 and is collected as product vapor 110 which is an enriched product enriched in heavy oxygen isotopes.

In the following, the settings for the feed vapors 104 and 108 for the first and second columns are explained.

The flow rate of the second column feed vapor 104 is set to obtain a sufficient amount for the flow rate of the desired component accompanying the second column feed vapor 104 with respect to the flow rate of the desired component accompanying the product (for this embodiment, this is only the product vapor 110) collected to the outside of the apparatus from the second column or the third column.

In more detail, if the flow rate of the desired component accompanying the product 110 collected to the outside of the apparatus from the second column or third column divided by the flow rate of the desired component accompany the second column feed vapor 104 is equal to the yield of the desired component, it is preferable for the setting to be such that the yield of this desired component will be 1% to 10% or less.

If the amount of the second column feed vapor 104 is made to be too small (if an attempt is made to make the yield of the desired components greater), the distillation efficiencies of the second column and the third column are reduced. In contrast, if the amount of the second column feed vapor 104 is made to be too great, the distillation efficiency does not improve very much with respect to the increase in the amount of heat exchange in the first column reboiler 6 and the second column condenser 7.

In addition, the flow rate of the third column feed vapor 108 is set to obtain a sufficient amount for the flow rate of the desired component accompanying the third column feed vapor 108 with respect to the flow rate of the desired component accompanying the product (for this embodiment, this is only the product vapor 110) recovered to the outside of the apparatus from the third column.

In more detail, if the flow rate of the desired component accompanying the product 110 collected on the outside of the apparatus from the third column divided by the flow rate of the desired component accompany the third column feed vapor 108 is equal to a yield of the desired component, it is preferable for the setting to be such that the yield of the desired component will be 1% to 10% or less.

If the amount of the third column feed vapor 108 is made to be too small (if an attempt is made to make the yield of the desired components greater), the distillation efficiencies of the third column are reduced. In addition, if the amount of the third column feed vapor 108 is made to be too great, the distillation efficiency does not improve very much with respect to the increase in the amount of heat exchange in the second column reboiler 8 and the third column condenser 9.

In the following, the operation control method of each of the above-described columns will be explained.

When considering a given column, there are the following four controllable sections.

1. The valve in the piping which supplies vapor from the $k^{th}$ column to the $(k+1)^{th}$ column.
2. The valve in the piping which supplies liquid from the $(k+1)^{th}$ column to the $k^{th}$ column.
3. The amount of heat exchange in the reboiler (the pressure and flow rate of the warm medium)
4. The amount of heat exchange in the condenser (the pressure and flow rate of the cold medium)

It is difficult to adjust all four simultaneously. Therefore, basically, in each column, 1 and 3 are fixed and 2 and 4 are adjusted while watching the condition of the apparatus.

Firstly, the adjustment of 3, the amount of heat exchange in the reboiler (the pressure and flow rate of the warm medium), is carried out in the following way.

It maintains the amount of heat exchange in the reboiler after it has been set in advance so that the vapor load of each column is at a suitable value (planned value). It is preferable for the setting to be such that the density-correlated superficial velocity (hereinafter referred to as the superficial F factor) is $0.5$ m/s(kg/m$^3$)$^{0.5}$ or greater and $3.0$ m/s(kg/m$^3$)$^{0.5}$ or less, preferably $0.7$ m/s(kg/m$^3$)$^{0.5}$ or greater and $2.2$ m/s(kg/m$^3$)$^{0.5}$ or less.

Next, the valves 12$v$ and 13$v$ which are in the piping (conduits 12 and 13) which supply vapor from the $k^{th}$ column to the $(k+1)^{th}$ column are adjusted. When the pressure at the tops of each of the columns is approximately equal, the pressure at the bottom of the $k^{th}$ column is greater than the pressure at the top of the $(k+1)^{th}$ column by amount of the pressure loss in the $k^{th}$ column. Consequently, in addition to the provision of a valve in way along of the piping, the flow rate of the vapor supplied from the $k^{th}$ column to the $(k+1)^{th}$ column is measured, and controlled to predetermined flow rate. This flow rate is not a strict one and once a precise and suitable flow rate is established, the degree of opening of the valve is not adjusted. The pressure of each column is constant, this flow rate rarely fluctuates.

Next, (4) the amount of heat exchange in the condenser (the pressure and flow rate of the cold medium) is set. This is set such that the pressure within each of the distillation columns is constant. Since (3) the amount of heat exchange in the reboilers is fixed, if the (4) amount of heat exchange in the condenser is small, the pressure in the distillation columns continues to increase.

In addition, on the other hand, if the (4) amount of heat exchange in the condensers is large, the pressure in the distillation columns continues to decrease. Even if adjustment is made and an optimal value is achieved at one point in time, the heat entering the apparatus varies due to the weather, and the pressure fluctuates.

Consequently, it is necessary to control (4) the amount of heat exchange in the condenser while always measuring the pressure in each of the columns.

Next, (2) the valves 14$v$ and 15$v$ of the piping (conduits 14 and 15) which returns the liquid to the $k^{th}$ column from the $(k+1)^{th}$ column is adjusted.

The control values 14$v$ and 15$v$ are installed at a position relatively close to the condenser at the top of the column within a range at which it is possible to obtain a prescribed liquid head. This is in order to reduce the liquid hold-up within the piping.

The degree of opening of these valves is adjusted while measuring the liquid level at the bottom of each column.

When the degree of opening is too small, and the amount returned to the $k^{th}$ column from the $(k+1)^{th}$ column becomes small, since the valves 12$v$ and 13$v$ in the vapor piping are fixed, the hold-up of the process liquid of the $(k+1)^{th}$ column to the $n^{th}$ column increases rapidly. The pressure of each column is maintained at a constant level by means of (4) the condensers 5, 7, and 9. Therefore, the increase in the hold-up the liquid level at the bottom of the distillation columns increases.

On the other hand, when the return to the $k^{th}$ column from the $(k+1)^{th}$ column is large, the liquid level at the bottom of the distillation column decreases.

Consequently, (2) the valve of the liquid piping must be controlled in such a way that the height of the level of the liquid in the bottom of each distillation column is constant.

In addition, the valves 14v and 15v are installed at a position relatively close to the condensers of the tops of the columns within a range at which it is possible to obtain a prescribed liquid head. However, from the point of view of ease and certainty of control providing them at a position near to the reboilers is good.

In the apparatus of the present embodiment, since the outlet of the first column reboiler 6 and the inlet of the second column condenser 7 are connected by the first introduction conduit 12 and the outlet of the second column reboiler 8 and the inlet of the third column condenser 9 are connected by the second introduction conduit 13, and since the outlet of the second column condenser 7 and the inlet of the first column reboiler 6 are connected by second return conduit 14; the outlet of the third column condenser 9 and the inlet of the second reboiler 8 are connected by the second return conduit 15, it is possible to return a part of the condensed liquid which has passed through the condensers 7 and 9 as return liquid 107 and 112 to the reboilers 6 and 8.

For this reason, it is possible to set the pressure within columns 2 and 3 lower than in the past, and it is possible to increase the relative vapor pressure between each of the isotopes within each column thereby to improve the efficiency of the distillation. As a result, it is possible to reduce both the packing height of each column and the amount of liquid hold-up, and thereby it is possible to shorten the start-up time.

In addition, for the above-mentioned reasons, it is possible to obtain with good efficiency a product containing a high concentration of heavy oxygen isotopes.

In addition, in conventional apparatuses (FIG. 19), all of the supply conduits from an earlier stage column to a later stage column are filled with liquid. In contrast, in the apparatus of the present embodiment, of the return conduits, only the portions corresponding to the liquid head portions which correspond to the difference in pressure of these columns are full of liquid. In other words, of the return conduits from a later stage column to an earlier stage column, only the portions of conduits corresponding to liquid head portions which correspond to the pressure difference of those columns for which the return of the return liquid 107 and 112 liquefied in the condensers 7 and 9 to the previous stage column is necessary are filled with liquid.

For this reason, the amount of liquid hold-up is reduced, and it is possible for the start-up time for the apparatus to be shortened even more.

In particular, when the diameter of the distillation columns is small, the diameter of the piping of the return conduits is relatively large. Therefore, the difference between the liquid hold-up of the apparatus of the present invention and that of a conventional apparatus is considered to be large. In addition, from the point of view of the start-up time, the superiority of the apparatus of the present invention is considered to be even more obvious.

In addition, by means of the use of structured packing (promoting-fluid-dispersion type structured packing or non-promoting-fluid-dispersion type structured packing) in columns 1, 2, and 3, it is possible to reduce pressure loss within the columns, and it is possible for the pressure within the columns to be set low. For this reason, it is possible to increase the relative vapor pressure between the various components, to increase distillation efficiency, and in addition, to reduce the amount of liquid hold-up, and to further shorten the start-up time. In addition, accompanying this, it is possible to reduce operation costs.

In addition, by means of using promoting-fluid-dispersion type structured packing, it is possible to increase the efficiency of vapor-liquid contact within the columns, and to increase the efficiency of the enrichment in heavy isotopes.

In the distillation column of the above described embodiment, the outlet of the second column condenser 7 and the inlet of the first column reboiler 6 are connected by the first return conduit 14 and the outlet of the third column condenser 9 and the inlet of the second column reboiler 8 are connected by the return conduit 15. However, the apparatus of the present invention is not limited to this embodiment, and the first conduit can be used to connect the outlet of the second condenser 7 and the middle section of the first column 1 as shown by reference 14a (the conduit indicated by the broken line), and the second return conduit can be used to connect the outlet of the third column condenser 9 and the middle section of the second column 2 as shown by reference 15a (the conduit indicated by the broken line).

In addition, the columns 1, 2 and 3 are not limited to packed columns in which the above-mentioned packing is used, and it is also possible to use wetted wall columns.

Figure 7:
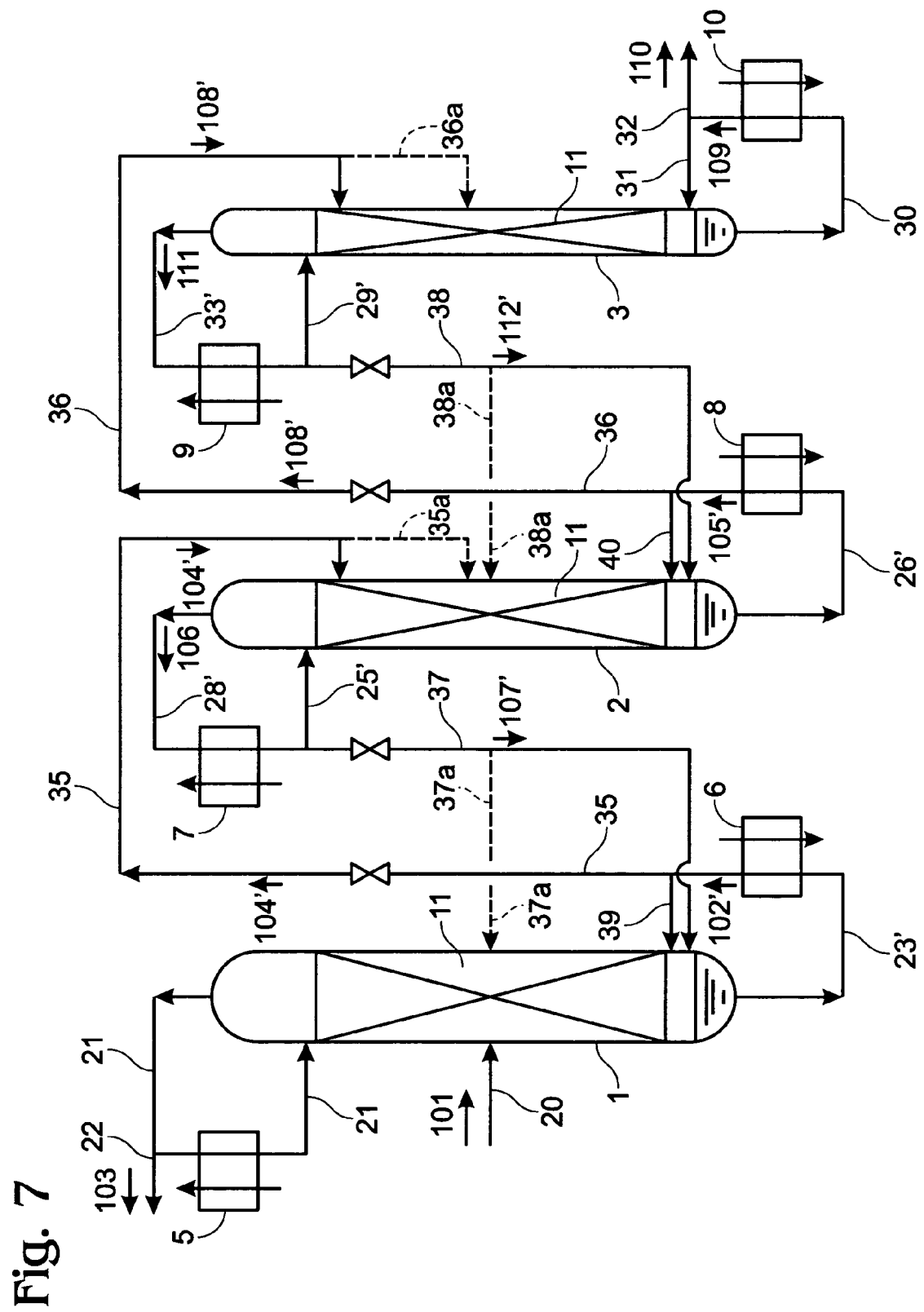
FIG. 7 is a schematic structural drawing showing a second embodiment of the apparatus of the present invention.

FIG. 7 shows a second embodiment of the apparatus of the present invention. The apparatus shown here is different from the apparatus shown in FIG. 1 on the following points.

(1) The outlet of the first column reboiler 6 and the top of the second column 2 are directly connected by means of the first introduction conduit 35, such that it is possible for the second column feed vapor 104' which has passed through the first column reboiler 6 to be supplied directly to the top of the second column 2.

(2) The outlet of the second column reboiler 8 and the top of the third column 3 are directly connected by means of the second introduction conduit 36, such that it is possible for the third column feed vapor 108' which has passed through the second column reboiler 8 to be supplied directly to the top of the third column 3.

(3) The outlet of the second column condenser 7 and the bottom of the first column 1 are directly connected by means of the first return conduit 37, such that it is possible for the return liquid 107' from the second column condenser 7 to be returned to the bottom of the first column 1.

(4) The outlet of the third column condenser 9 and the bottom of the second column 2 are directly connected by means of the second return conduit 38, such that it is possible for the return liquid 112' from third column condenser 9 to be returned to the bottom of the second column 2.

The conduit indicated by the broken line in the figure is a modification of the apparatus of the present embodiment.

In the following, an example of a second embodiment of the method for enrichment of heavy oxygen isotopes of the present invention will be explained in detail using, as an example, a situation in which the apparatus shown in FIG. 7 is used.

An oxygen vapor-starting material supplied to the inside of the first column 1 as first column feed 101 via a conduit 20 is distilled by means of vapor-liquid contact within the first column 1.

The column bottom liquid which has been enriched in heavy oxygen isotopes within the first distillation column 1 is introduced into the first column reboiler 6 through the conduit 23', is vaporized, and is drawn off from the first column reboiler 6 as the first column output vapor 102'.

A part of the output vapor 102' is returned to the lower part of the first column 1 via conduit 39, and the other part is introduced directly into the top of the second column 2 through first introduction conduit 35 as second column feed vapor 104'.

In the second column 2, the ascending vapor which reaches the top of the column and which has a reduced concentration of heavy oxygen isotopes is drawn off from the second column 2 through the conduit 28' as column top vapor 106. It is condensed in the second column condenser 7, and then divided. One part is returned as reflux liquid to the upper part of the second column 2 through the conduit 25'. The other part is returned to the bottom of the first column 1 as first return liquid 107' through the first return conduit 37.

The column bottom liquid which has been enriched in heavy oxygen isotopes within the second column 2 is introduced into the second column reboiler 8 through conduit 26', where it is vaporized, and then drawn off from the reboiler 8 as second column output vapor 105'.

A part of the output vapor 105' is returned to the lower part of the second column 2 through conduit 40. The other part is directly introduced into the top of the third column 3 through the second introduction conduit 36 as the third column feed 108'.

In the third column 3, the ascending vapor which reaches the top of the column and which has a reduced concentration of heavy oxygen isotopes is drawn off from the third column 3 through the conduit 33' as column top vapor 111. It is condensed in the third column condenser 9, and then divided. One part is introduced as reflux liquid to the upper part of the third column 3 through the conduit 29'. The other part is returned to the bottom of the second column 2 as second return liquid 112' through the second return conduit 38.

In the apparatus of the present embodiment, it is possible to return a part of the condensed liquid which has passed through the condensers 7 and 9 to the previous stage column by means of the weight (head pressure) of the condensed liquid itself. For this reason, the amount of liquid can be less compared with conventional methods which use liquid pumps, and, as with the apparatus of the above-described first embodiment, it is possible to shorten the start-up time. In addition, as a result of a shorter total column length due to the adoption of a form in which the bottoms of the columns and the tops of the columns are connected, it is possible to obtain a product containing a high concentration of heavy oxygen isotopes with good efficiency.

In the apparatus of the above-described embodiment, the outlet of the first column reboiler 6 and the top of the second column 2 are connected by means of the first introduction conduit 35, and the outlet of the second column reboiler 8 and the top of the third column 3 are connected by means of the second introduction conduit 36, in addition, the outlet of the second column condenser 7 and the bottom of the first column 1 are connected by means of the return conduit 37, and the outlet of the third column condenser 9 and the bottom of the second column 2 are connected by means of the second return conduit 38. However, the apparatus of the present invention is not limited to this embodiment.

For example, it is possible for the first and second introduction conduits to be connected to the middle sections of columns 2 and 3 rather than to the tops of columns 2 and 3 as shown by references 35a and 36a (the conduits indicated by the broken lines). In addition, it is also possible for the first and second return conduits to be connected to the middle sections of the first and second columns rather than to the bottoms of the first and second columns as shown by references 37a and 38a.

Figure 8:
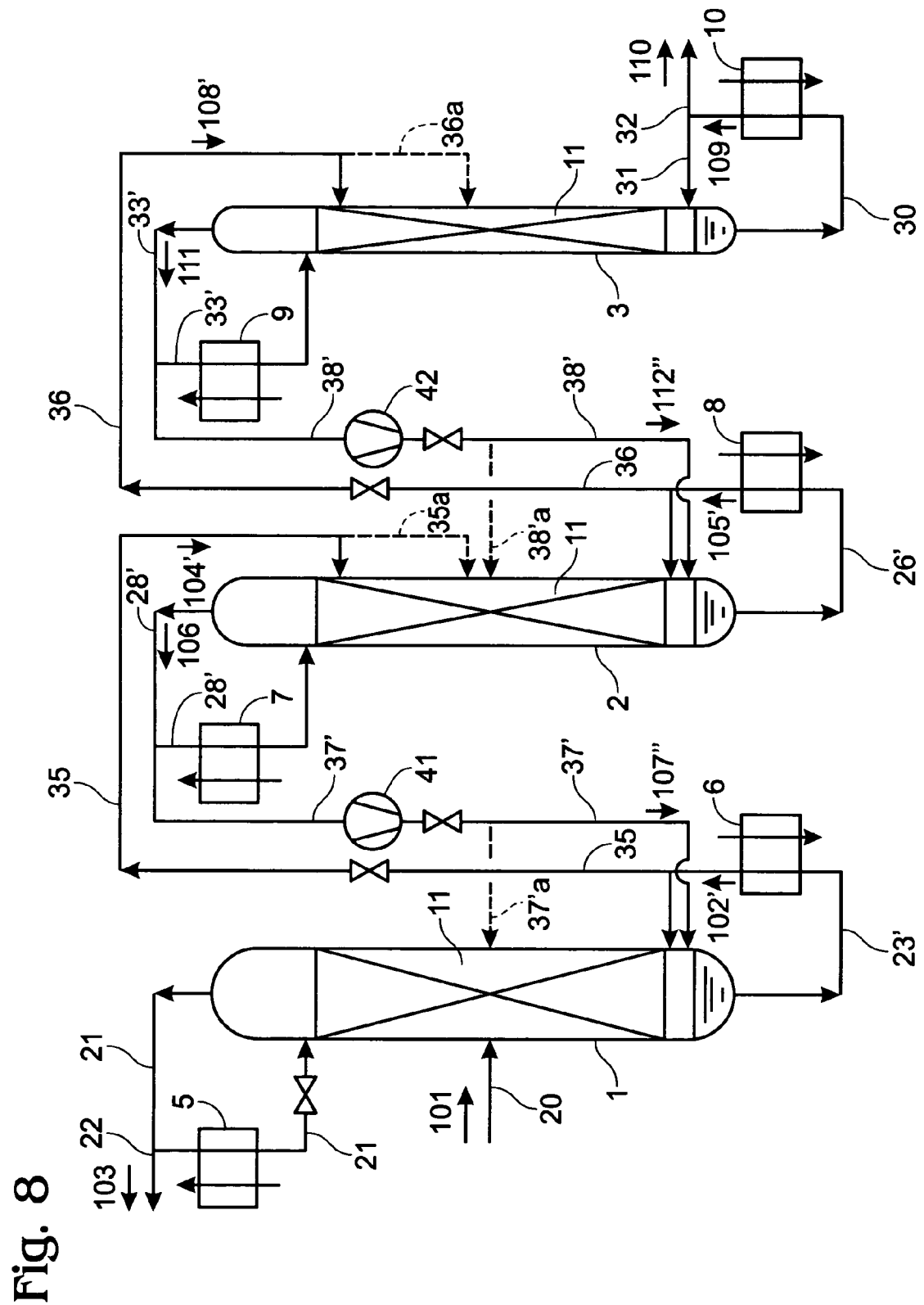
FIG. 8 is a schematic structural drawing showing a third embodiment of the apparatus of the present invention.

FIG. 8 shows a third embodiment of the apparatus of the present invention. The apparatus shown here differs from the apparatus shown in FIG. 7 on the following points.

(1) The conduit 28' which carries the column top vapor 106 of the second column 2 to the second column condenser 7 and the bottom of the first column 1 are connected by the first return conduit 37' such that a part of the top vapor 106 of the second column 2 can be returned to the bottom of the first column 1.

(2) The conduit 33' which carries the top vapor 111 of the third column 3 to the third column condenser 9 and the bottom of the second column 2 are connected by the second return conduit 38' such that a part of the top vapor 111 of the third column 3 can be returned to the bottom of the second column 2.

(3) Blowers 41 and 42 are respectively provided in the first and second return conduits 37' and 38'.

Figure 9:
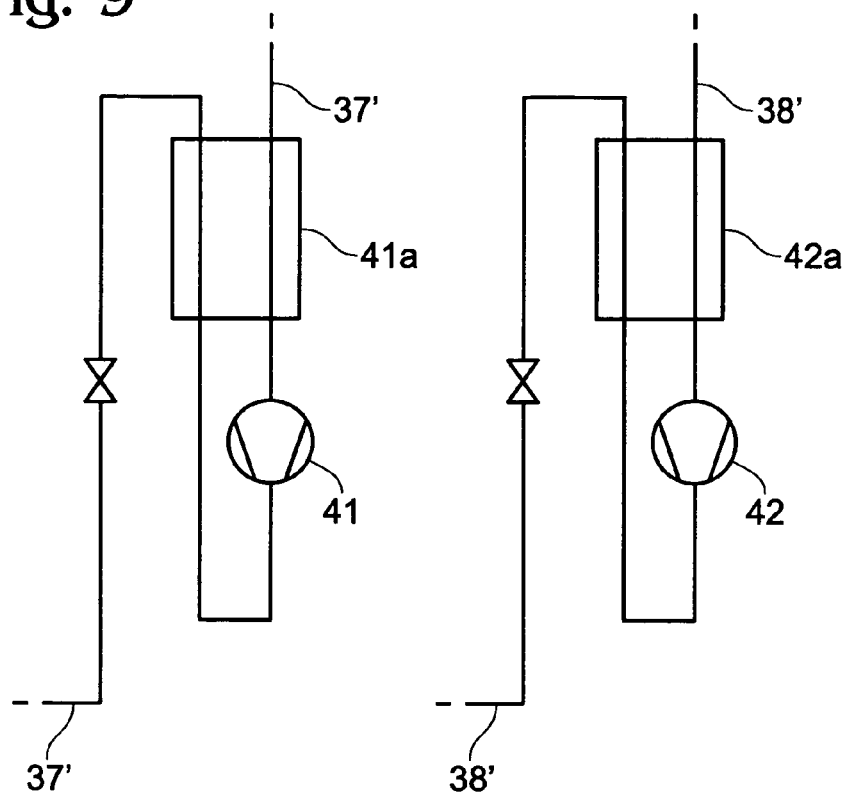
FIG. 9 is a schematic structural diagram showing a modified example of the apparatus shown in FIG. 8.

Normal temperature compressors or low temperature compressors can be used as blowers 41 and 42. However, when a normal temperature compressor is used, as shown in FIG. 9, it is necessary to have heat exchanges 41a and 42a in the return conduits 37' and 38'.

In the following, a third embodiment of the method for enrichment in heavy oxygen isotopes of the present invention will be explained for a situation in which the apparatus shown in FIG. 8 is used as an example.

In the second column 2, ascending vapor which reaches the top of the column and in which the concentration of heavy oxygen isotopes is reduced is drawn off from second column 2 through conduit 28' as top vapor 106, and divided.

One part of the top vapor 106 which has been divided is condensed in the second column condenser 7, and is then returned to the top of the second column 2 where it becomes reflux liquid for that column. The other part passes through the first return conduit 37' and reaches the blower 41 where it is pressurized, and then returned to the bottom of the first column 1 as first return liquid 107'.

In the same way, the column top vapor 111 drawn off from the top of the third column 3 is divided after being drawn off from the third column 3. One part is condensed in the third column condenser 9, and then return to the top of the third column to become reflux liquid for that column. The other part passes along the second return conduit 38 and reaches the blower 42 where it is pressurized and then returned to the bottom of the second column 2 as second return liquid 112'.

In the apparatus of the present embodiment, since the supply for each conduit is in vapor form, and not a liquid form, it is possible to shorten the start-up time in the same way as for the apparatus of the above mentioned first embodiment. In addition, since the bottom of the columns are connected to the tops of the columns and the tops of the columns are connected to the bottoms of the column respectively, it is possible to obtain a product which has a high concentration of heavy oxygen isotopes.

In the apparatus of the present embodiment, the outlet of the first column reboiler 6 and the top of the second column 2 are connected by means of the first introduction conduit 35, and the outlet of the second column reboiler 8 and the top of the third column 3 are connected by means of the second introduction conduit 36, and in addition, the inlet of the second column condenser 7 and the bottom of the first column 1 are connected by means of the first return conduit 37' and the inlet of the third column condenser 9 and the bottom of the second column 2 are connected by means of the second return conduit 38'. However, the present embodiment is not limited to this.

For example, it is possible for the first and second introduction conduits to be connected to the middle sections of the second and third columns 2 and 3 as shown by references 35a and 36a (the conduits indicated by the broken lines), and for the first and second return conduits to be connected to the middle sections of the first and second columns rather than to the bottoms of the first and second columns as shown by the references 37a' and 38a'.

In the above described embodiment, an apparatus having three distillation columns is shown. However, in the apparatus of the present invention, the number of distillation columns is not limited to this embodiment.

Figure 10:
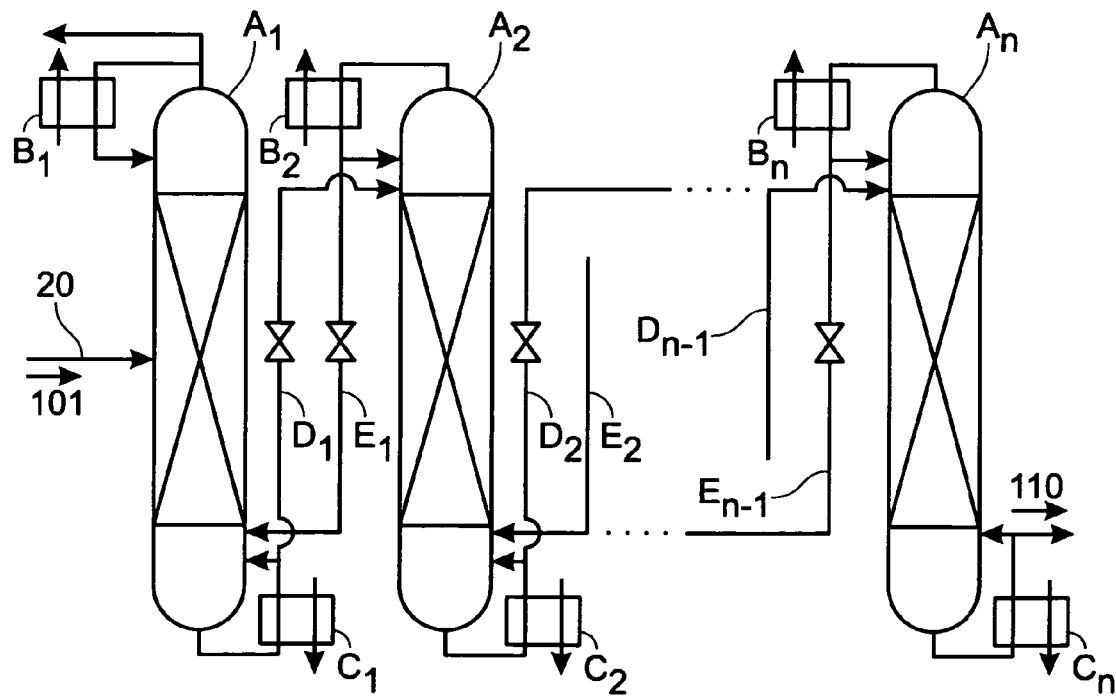
FIG. 10 is a schematic structural diagram showing another embodiment of the apparatus of the present invention.

In the apparatus shown in FIG. 10, the number of distillation columns is n.

The apparatus shown here comprises n number of distillation columns $A_1$ to $A_n$; condensers $B_1$ to $B_n$ which are provided in the vicinity of the top of these distillation columns $A_1$ to $A_n$; reboilers $C_1$ to $C_n$ which are provided in the vicinity of the bottoms of the columns $A_1$ to $A_n$; introduction conduits $D_1$ to $D_{n-1}$ which connect the outlets of the $k^{th}$ column reboilers $C_k$ provided in the vicinity of the bottoms of the $k^{th}$ columns ($1 \leq k \leq (n-1)$) to the tops of the $(k+1)^{th}$ columns; and return conduits $E_1$ to $E_{n-1}$ which connect the outlets of the $(k+1)^{th}$ column condensers $B_{k+1}$ of the $(k+1)^{th}$ columns to the bottoms of the $k^{th}$ columns.

The number n of the distillation columns can be, for example, from 2 to 100.

Figure 11:
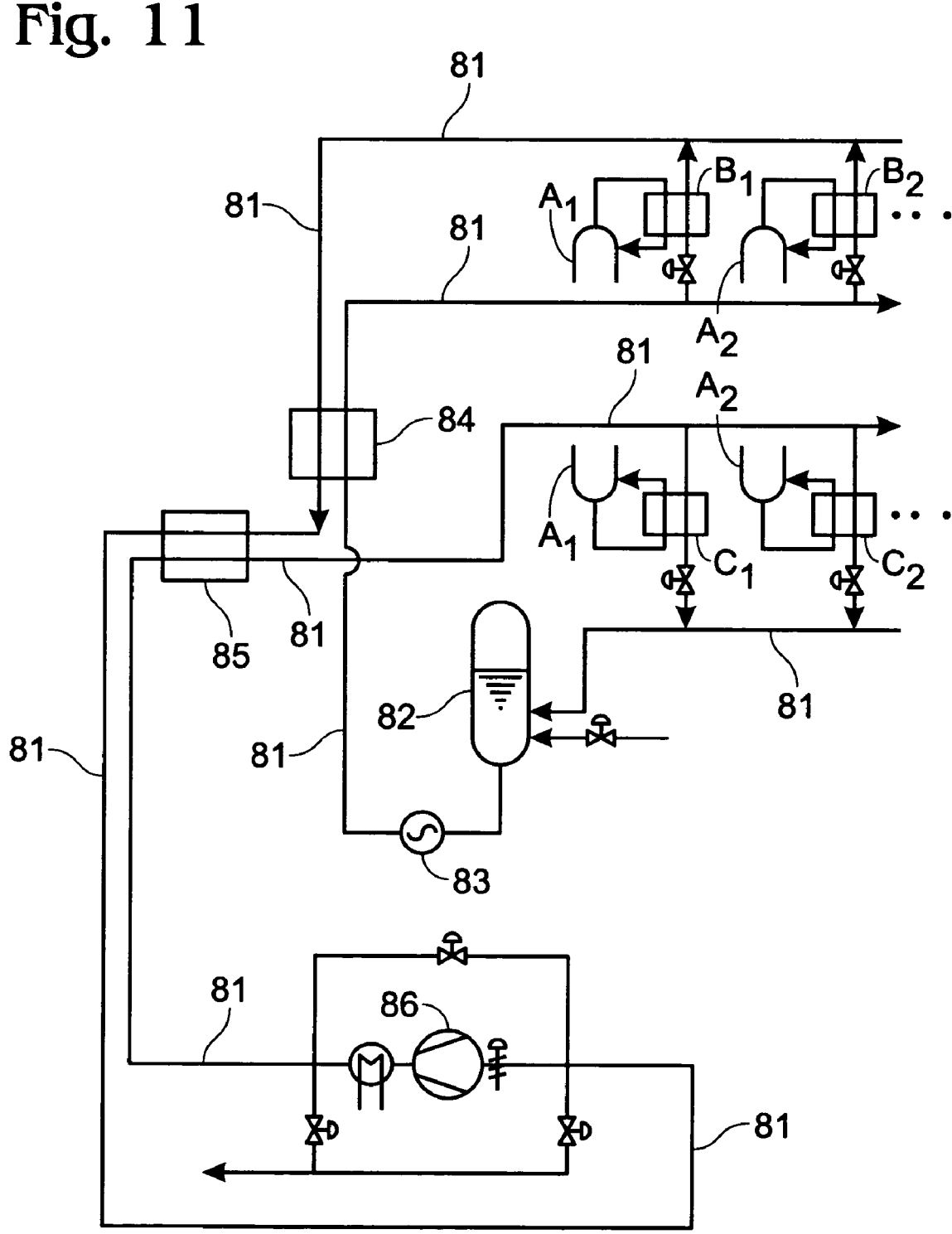
FIG. 11 is a schematic structural diagram showing the circulation system for a medium for heat exchange which is used in the apparatus shown in FIG. 10.

In addition, the circulation system for the medium for heat exchange for the reboilers and condensers of the apparatus shown in the above-mentioned FIG. 10 is shown in FIG. 11.

As shown in FIG. 11, each of the condensers $B_1$ to $B_n$, and reboilers $C_1$ to $C_n$ are connected by means of the circulation conduit 81 for the medium for heat exchange.

This circulation conduit 81 is such that the medium for heat exchange within the storage tank 82 is drawn off, passes through the pump 83 and the first passage of the subcooler 84, and is introduced into the condensers $B_1$ to $B_n$. Then, it passes through the second passage of the subcooler 84 and reaches the first conduit of the heat exchanger 85. Next, it passes through the blower 86 and the second passage of the heat exchanger 85, is introduced into the reboilers $C_1$ to $C_n$, and then returned to the storage tank 82. In addition, the subcooler 84 is for the purpose of cooling the medium for heat exchange in order to prevent vaporization of the medium for heat exchange prior to its reaching the condensers.

In the same way, in the present invention, the number of distillation columns is not limited to the number shown in the figures for the apparatus of the first embodiment shown in FIG. 1, the apparatus of second embodiment shown in FIG. 7, and the apparatus of the third embodiment shown in FIG. 8, and can be set optionally.

In addition, the above described embodiment shows a method for enrichment in the heavy isotopes of oxygen by means of cryogenic distillation of an oxygen starting material. However, the present invention is not limited to this embodiment. It is also possible to produce heavy oxygen water by carrying out distillation using water as the starting material and using the apparatus of the above described embodiments to distill this water to enrich it in at least one type of heavy oxygen water of $H_2{}^{17}O$, $H_2{}^{18}O$, $D_2{}^{17}O$, $D_2{}^{18}O$, $DH^{17}O$ and $DH^{18}O$, which contain heavy oxygen isotopes.

In this situation, in the same way as in the above-mentioned first embodiment, it is possible to shorten the start-up time. In addition, it is possible to obtain a heavy oxygen water product containing a high concentration of heavy oxygen isotopes.

Figure 12:
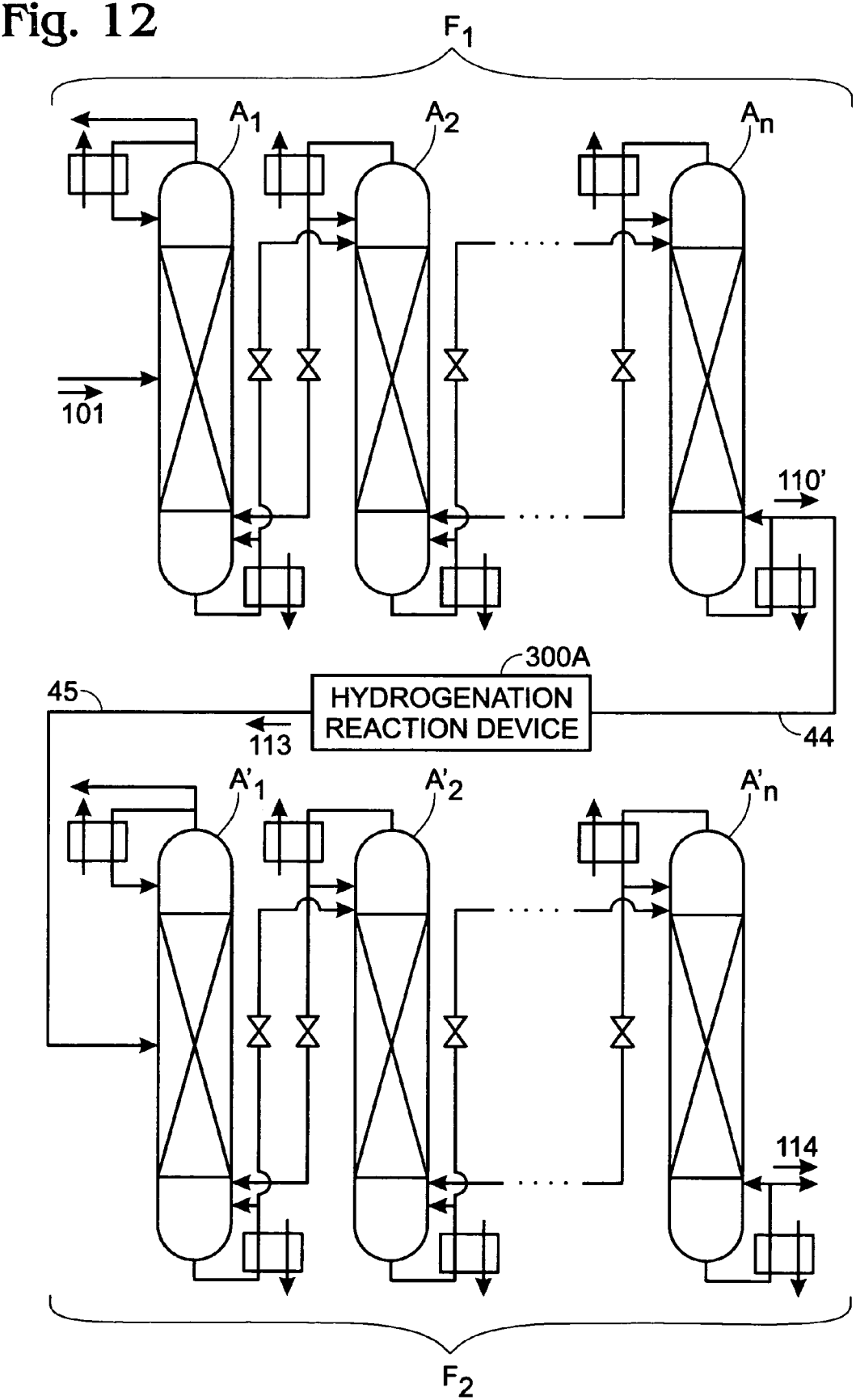
FIG. 12 is a schematic structural diagram showing yet another example of the apparatus of the present invention.
Figure 13:
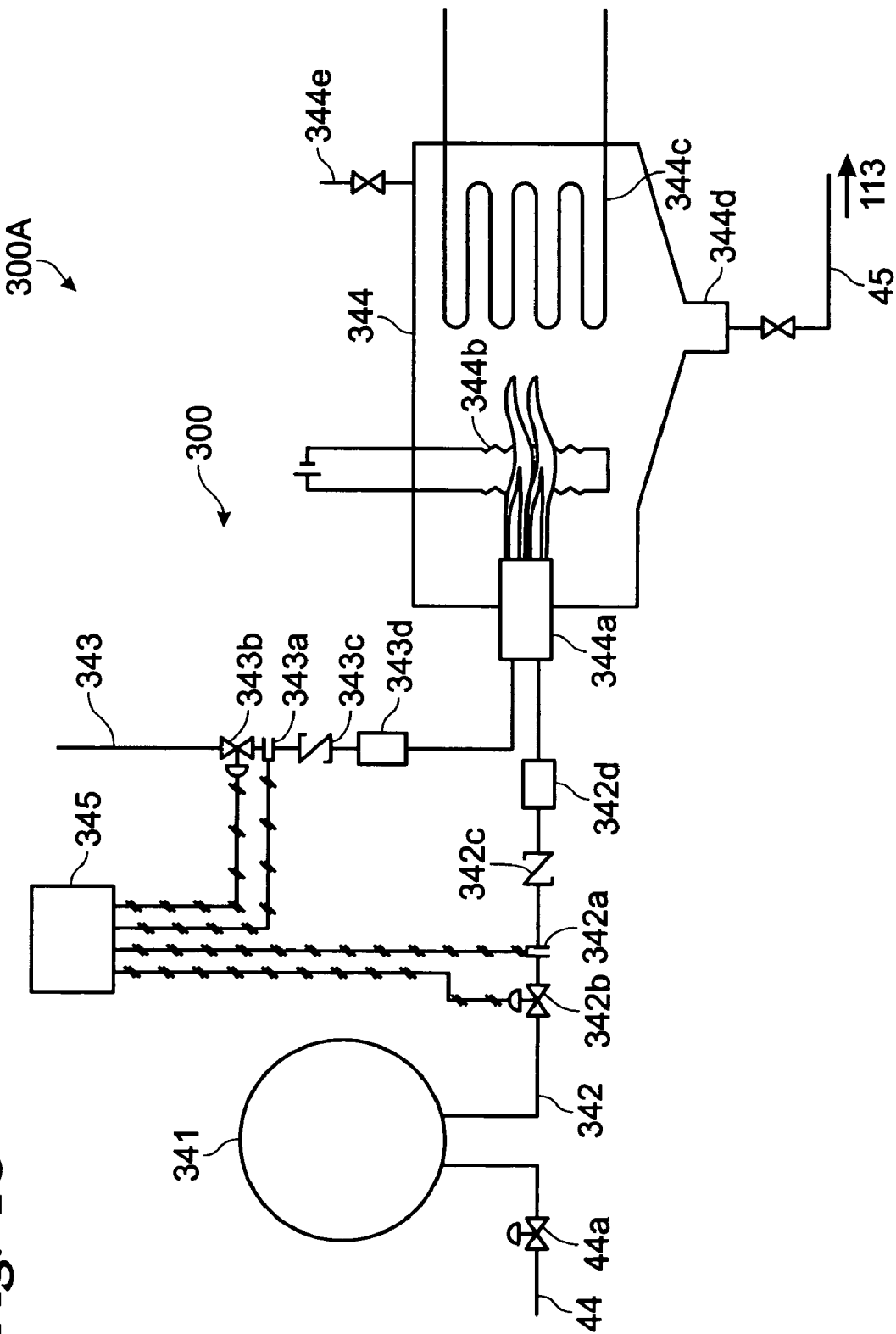
FIG. 13 is a schematic structural diagram showing a hydrogenation device of the apparatus shown in FIG. 12.

FIG. 12 and FIG. 13 show an apparatus which can be used for carrying out another embodiment of the method of producing heavy oxygen water of the present invention. The apparatus shown here comprises an oxygen distillation column unit $F_1$ for distillation of oxygen which comprises a plurality of distillation columns $A_1$ to $A_n$; a water distillation column unit $F_2$ for distillation of water which comprises a plurality of distillation columns $A'_1$, to $A'_n$; and a hydrogenation reaction device 300A provided between these units $F_1$ and $F_2$.

The distillation column units $F_1$ and $F_2$ may adopt the structure of the apparatus shown in FIG. 10.

The hydrogenation reaction device 300A shown in FIG. 13 comprises a buffer tank 341 for temporarily storing the enriched material (oxygen) which has passed through the oxygen distillation column unit $F_1$; a conduit 44 for introducing the oxygen into the buffer tank 341; a conduit 343 for introducing hydrogen (or deuterium) supplied from a supply source not shown in the figure; a combustion chamber 344 for reacting the oxygen and hydrogen supplied from the conduits 342 and 343; and a combustor 300 having a controller 345.

The combustion chamber 344 comprises a burner 344a for mixing and combusting oxygen and hydrogen supplied into the combustion chamber 344; a heater 344b for igniting the oxygen-hydrogen mixed gas; and a cooling coil 344c for cooling the reactant product (i.e., water vapor). Additionally, reference 344d indicates a discharge opening which is provided for expelling the reactant product (water) of the combustion chamber 344 via a valve.

The controller 345 regulates a flow control valve 342b by means of signals based on the flow rate of oxygen measured by an oxygen flow rate detector 342a provided in conduit 342, and thereby the controller 345 is able to adjust the supply flow rate of oxygen gas supplied into the combustion chamber 344 via the conduit 342.

In addition, the controller 345 regulates a flow control valve 343b by means of signals based on the flow rate of hydrogen which is measured by a hydrogen flow rate detector 343a provided in the conduit 343, and thereby the controller 345 is able to adjust the supply volume of hydrogen supplied into the combustion chamber 344 via the conduit 343.

Further, references 342c and 343c indicate check valves; references 342d and 343d indicate back-fire prevention chambers; and reference 344e indicates a conduit for discharging the small amount of unreacted gas remaining in the combustion chamber 344, via a valve.

In the following, an embodiment of the method of producing heavy oxygen water of the present invention will be explained for an example in which the above-described apparatus is used.

The oxygen starting material is supplied to the oxygen distillation column unit $F_1$, and an intermediate vapor 110' is obtained which is an enriched material enriched in the heavy isotopes of oxygen.

This intermediate vapor 110' (oxygen vapor) is introduced into the combustor 300 of the hydrogenation reaction device 300A via conduit 44 and control valve 44a.

The oxygen gas introduced into the combustor 300 passes through the buffer tank 341, and is introduced into the combustion chamber 344 via the conduit 342 and through the burner 344a.

Simultaneously, the hydrogen supplied from a supply source not shown in the figures is supplied to the combustion chamber 344 via the conduit 343 and through the burner 344a.

At this point, the controller 345 performs a calculation based on signal based on a predetermined value and a feedback signal based on the flow rate of oxygen measured by the oxygen flow rate detector 342a. The controller regulates the flow rate control valve 342b by means of a signal resulting from this calculation. In the same manner, controller 345 performs a calculation based on the signal based on a predetermined value and a feedback signal based on the flow rate of hydrogen measured by the hydrogen flow rate detector 343a. The controller regulates the flow rate control valve 343b by means of a signal resulting from this calculation. As a result, the aforementioned oxygen and hydrogen are supplied into the combustion chamber 344 in volumes which approximate the stoichiometric volume for producing water.

The oxygen and hydrogen supplied to the combustion chamber 344 are always regulated to a volume which closely approximates the aforementioned stoichiometric volume by means of the aforementioned feedback control. However, despite this, excess supplied vapor is regularly discharged via a valve from a discharge conduit 344e, and this prevents the gas from accumulating in the combustion chamber 344.

In order to further reduce the volume of the exhaust gas, it is preferable to jointly employ an even more precise controlling means, such as a feed-forward controlling method.

The aforementioned oxygen and hydrogen supplied into the combustion chamber 344 are mixed by means of the burner 344a, and subsequently, jetted into the combustion chamber 344, ignited by means of the heater 344b, and reacted with each other to produce water.

Most of the produced water is condensed by the cooling coil 344c, and subsequently expelled from the combustion chamber 344 via the discharge opening 344d, and introduced into the water distillation column unit $F_2$ through conduit 45 as produced water 113.

Since this produced water 113 is obtained using the intermediate product vapor 110', which is an enriched material in heavy oxygen isotopes, it is heavy oxygen water which contains a large number of heavy oxygen isotopes.

The water distillation column unit $F_2$ has the same structure as the oxygen distillation column unit $F_1$, therefore, in the same way as the enrichment process for heavy oxygen isotopes which occurs in the unit $F_1$, the heavy components within the produced water 113 that is $H_2^{17}O$, $H_2^{18}O$, $D_2^{17}O$, $D_2^{18}O$, $DH^{17}O$ and $DH^{18}O$, are enriched within the distillation unit $F_2$ and collected as the heavy oxygen water product 114.

Figure 14:
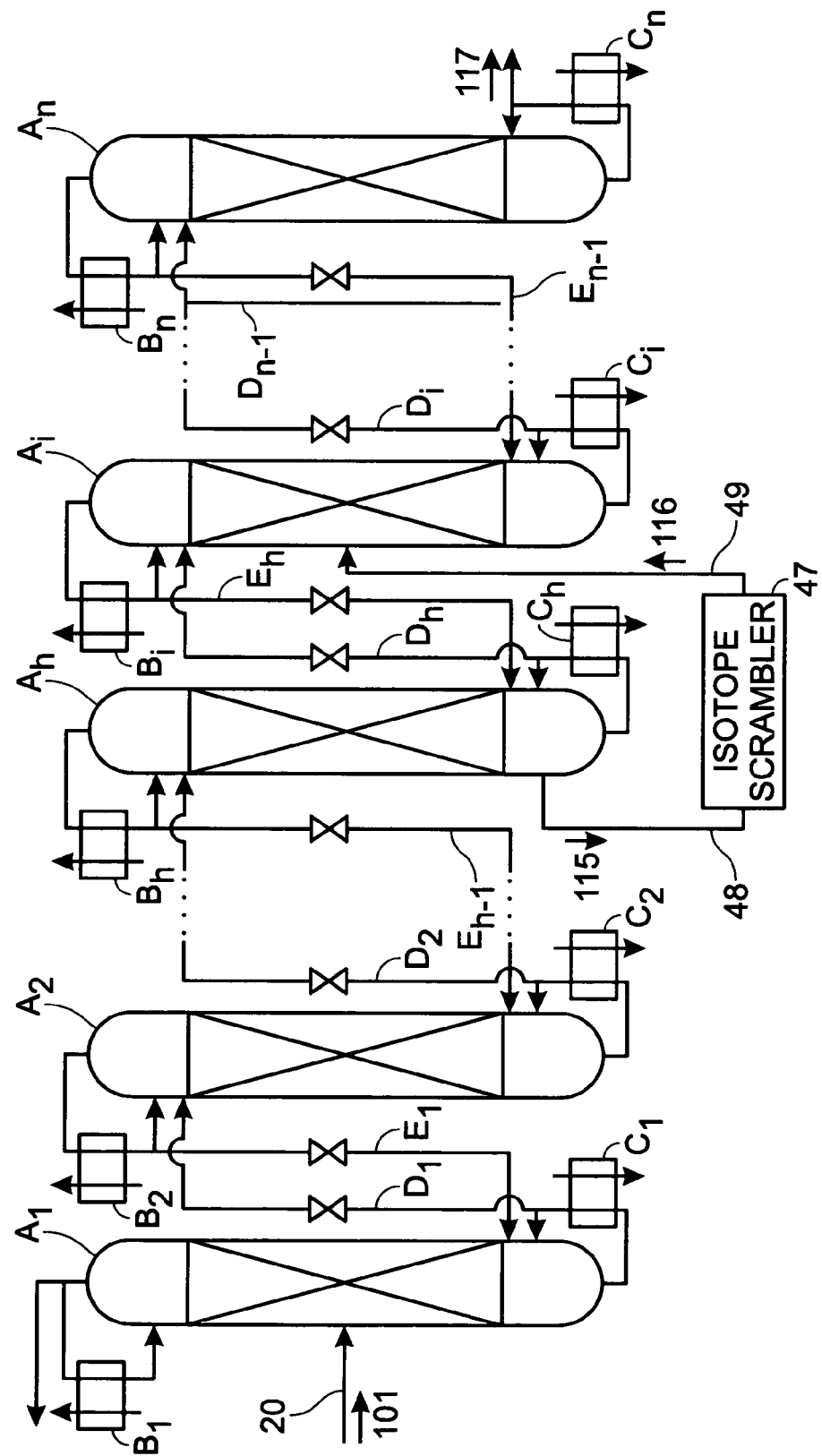
FIG. 14 is a schematic structural diagram showing yet another embodiment of the apparatus of the present invention.

In the apparatus of the present invention, it is possible to shorten the start-up time in the same way as for the above-described first embodiment. In addition, it is possible to obtain a heavy oxygen water product which contains a high concentration of heavy oxygen isotopes FIG. 14 shows another embodiment of the apparatus of the present invention. The apparatus shown here comprises n number of distillation columns $A_1$ to $A_n$; condensers $B_1$ to $B_n$ which are provided in the vicinity of the top of these columns $A_1$ to $A_n$; reboilers $C_1$ to $C_n$ which are provided in the vicinity of the bottoms of the columns $A_1$ to $A_n$; introduction conduits $D_1$ to $D_{n-1}$ which connect the outlets of the $k^{th}$ column reboilers $C_k$ provided in the vicinity of the bottoms of the $k^{th}$ columns ($1 \leq k \leq (n-1)$) to the tops of the $(k+1)^{th}$ columns; return conduits $E_1$ to $E_{n-1}$ which connect the outlets of the $(k+1)^{th}$ column condensers $B_{k+1}$ of the $(k+1)^{th}$ columns to the bottoms of the $k^{th}$ columns; and isotope scrambler 47.

The isotope scrambler 47 is for further enriching the heavy oxygen isotope enriches material enriched by means of the columns $A_1$ to $A_h$, by means of oxygen isotope scrambling. The inlet side of the isotope scrambler is connected to the bottom of the $h^{th}$ column $A_h$ via the extraction conduit 48, and the outlet side of the isotope scrambler is connected to the middle section of the $i^{th}$ column $A_i$ which is at a later stage and adjacent to $h^{th}$ column $A_h$ via a return conduit 49.

As with the isotope scrambler 47, in addition to the use of an isotope exchange reaction catalyst, it is possible to temporarily form other compound from the oxygen molecules, and then subsequently break these compounds down to obtain oxygen molecules.

When using the former of these, as the isotope scrambler 47, the column bottom vapor of column $A_h$ which is an oxygen isotope enriched material is brought into contact with an isotope exchange reaction catalyst, to promote isotope exchange reactions discussed below within the enriched material, and thereby it is possible to further increase the concentration of molecules of heavy oxygen isotopes within the enriched material.

In this situation, the isotope scrambler 47 is provided with a catalytic column (not shown in the figure), and an isotope exchange reaction catalyst which is packed inside this catalytic column.

As this isotope exchange reaction catalyst, catalysts containing at least one type selected from the group comprising W, Ta, Pd, Rh, Pt, and Au can be used, for example.

In addition, as the isotope exchange reaction catalysts, in addition to those mentioned above, it is possible to use a catalyst including at least one type selected from the group comprising Ti-oxide, Zr-oxide, Cr-oxide, Mn-oxide, Fe-oxide, Co-oxide, Ni-oxide, Cu-oxide, Al-oxide, Si-oxide, Sn-oxide, and V-oxide. In addition it is possible to use one of either of the above-mentioned single catalysts or the above-mentioned metal oxide catalysts or to use a mixture of a plurality of them.

As with the isotope scrambler 47, when the latter is being used, the column bottom vapor of column $A_h$ which is a heavy oxygen isotope enriched material is temporarily converted to a different compound (for example, water), this is subsequently broken down to give molecular oxygen, and thereby the concentration of molecules of heavy oxygen isotope molecules within the enriched material is further increased. An example of the isotope scrambler used in this method is shown in FIG. 15.

Figure 15:
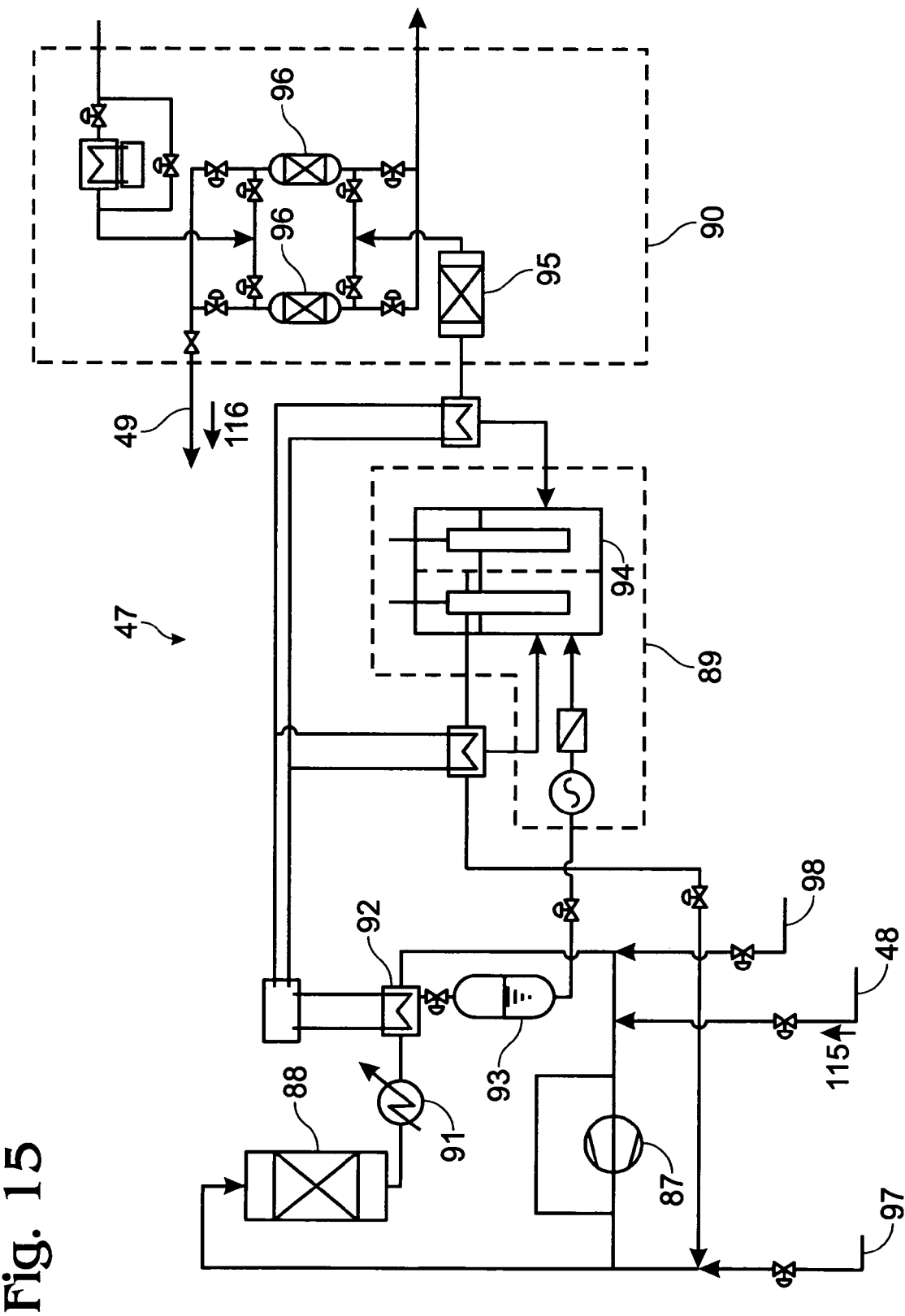
FIG. 15 is a schematic structural diagram showing an example of an isotope scrambler which is used in the apparatus shown in FIG. 14.

In FIG. 15, the isotope scrambler 47 comprises an argon circulation blower 87, a catalytic column 88 packed with an oxidation reaction catalyst, an electric catalytic cracker 89, and an oxygen purifier 90.

As the oxidation reaction catalyst which is packed in the catalytic column 88, a catalyst comprising at least one component selected from among the group comprising Pd, Pt, Rh, Ru, Ni, Cu, and Au can be used. In addition, it is possible to use one or more selected from the group comprising catalysts in which Pd, Pt, Rh, Ru, or the like, are carried by one of Al-oxide, Si-oxide, Ti oxide, Zr oxide, Cr oxide, V oxide, Co oxide or Mn oxide.

The argon circulation blower 87 is provided in order to circulate the gas within the argon circulation system having a catalytic column 88, a cooler 91, and a chiller 92. Since oxygen and hydrogen coexist within this circulation system, in consideration of the explosibility range, an argon supply conduit 98 for supplying argon for diluting the vapor within the circulation system is connected to the circulation system.

In addition, this circulation system is provided with a hydrogen supply conduit 97 for the purpose of maintaining the concentration of hydrogen at the outlet of the chiller 92 at approximately 2%.

Next, an embodiment of the method for enriching oxygen isotopes of the present invention will be explained for a situation in which the above-mentioned apparatus is used as an example.

Feed 101 is supplied to first column $A_1$ through conduit 20, and, thereafter, it is enriched in heavy oxygen isotopes by following the above described process until it reaches the column $A_h$, and thereby a column bottom liquid of column $A_h$ from which an enriched material is obtained.

Next, this column bottom liquid is introduced to the isotope scrambler 47 as introduction oxygen 115 through the conduit 48.

The oxygen vapor supplied to the suction side of the argon circulation blower 87 from the conduit 48 is mixed with argon and hydrogen, pressurized to approximately 80 to 100 kPa (gauge) by the blower 87, and then introduced into the catalytic column 88. In addition, at the discharge of the above-mentioned blower 87, small amounts of hydrogen (the part removed from the reaction at the catalytic column 95 discussed below) are supplied from the conduit 97. In the catalytic column 88, the hydrogen and the oxygen are reacted to produce water ($2H_2 - O_2 \rightarrow 2H_2O$), and the composition at the outlet of the catalytic column 88 is approximately 2% hydrogen, approximately 0.5% water vapor, and 97.5% argon.

This gaseous mixture is cooled by means of the cooler 91 and the chiller 92, and the water is separated into the storage tank 93. This water is sent to the electrolysis tank 94 (pressure 400 kPa gauge) by means of a pump provided within the electrolysis apparatus 89, undergoes electrolysis, and is separated into hydrogen containing a small amount of oxygen and oxygen vapor containing a small amount of hydrogen again. The former hydrogen is recovered from the above described argon circulation system. The small amounts of hydrogen and water in the latter oxygen are removed by means of an oxygen purifier 90 which has a catalytic column 95 and an absorber 96, and the oxygen is drawn off through conduit 49 and returned to the oxygen distillation column.

In order to prevent loss of oxygen vapor which is enriched in heavy oxygen isotopes within the regenerated gas of the absorber 96, separate super high-purity oxygen (having the same specifications as the first column feed vapor of the distillation column) is used.

In addition, the flow rate of the isotope scrambler return oxygen vapor 116 is extremely low compared with the amount of the ascending vapor within the distillation column to which the oxygen is returned. Therefore, it has almost no influence on the distillation efficiency even if it is returned into the distillation column as it is at normal temperature.

When the whole apparatus of the isotope scrambler 47 is considered, since there are only the conduit 49 for the purified isotope scrambler return vapor 116, and the outlet for the super high purity oxygen which is supplied separately for the purpose of regeneration in the absorber 96, the other gases circulate within the apparatus and there is almost no loss of gas. Consequently, the amount of the hydrogen and argon which are supplied by the supply line for hydrogen and argon is extremely small.

Within the catalytic column 88 of the isotope scrambler 47, oxygen and hydrogen are reacted due to the oxidation reaction catalyst and water is produced. For example, if A, B, C, and D are, respectively, any one of the isotope atoms $^{16}O$, $^{17}O$, and $^{18}O$, the atoms which make up the oxygen molecules are separated into different molecules of water by means of reactions like the following.

$2H_2 + AB \rightarrow H_2A + H_2B$; or $2H_2 + CD \rightarrow H_2C + H_2D$; or $2H_2 + AA \rightarrow H_2A + H_2A$ The relative abundance of each of the heavy oxygen isotopes within the reaction product (the water molecules) obtained thereby is determined by the relative abundance of each of the isotopes within the introduction oxygen 115.

In addition, within the electrolysis apparatus 89 of the isotope scrambler, the water molecules are broken down into the oxygen molecules and to hydrogen molecules by means of electrolysis. In the same way, if A, B, C, and D are, respectively, any one of the isotope atoms $^{16}O$, $^{17}O$, and $^{18}O$, the water molecules are broken down into oxygen molecules and hydrogen molecules by means of reactions like the following.

$H_2A + H_2C \rightarrow 2H_2 + AC$; or $H_2B + H_2D \rightarrow 2H^2 + BD$; or $2H_2C \rightarrow 2H_2 + CC$ The combination of the oxygen atoms which make up the oxygen molecules obtained here is determined randomly by the relative abundance of the oxygen isotopes present in the water molecules.

In addition, when a plurality of types of isotope molecules are present as described above, each molecule randomly exchanges the coupled atoms from which it is formed is called "isotope scrambling", and the apparatus in which this takes place is called an "isotope scrambler".

When a method using an isotope exchange reaction catalyst is used as the above-mentioned isotope scrambler 47, an isotope exchange reaction occurs within the catalytic column of the isotope scrambler 47 due to the isotope exchange reaction catalyst.

Isotope exchange is a reaction wherein coupled atoms in a two-atom molecule are exchanged with other atoms on the surface of a sufficiently heated catalyst.

In other words, if, for example, A, B, C, and D are, respectively, any one of the isotope atoms, $^{16}O$, $^{17}O$, and $^{18}O$, isotope exchange is a reaction in which:

AB+CD=AC+BD; or

AB+CD=AD+BC

If a particular isotope atom is considered, after sufficient time has passed, an isotope atom which couples to form a molecule is randomly determined according to the abundance ratio of each isotope constituent prior to isotope exchange.

Accordingly, the abundance ratio of each isotope in the reactant material (i.e., oxygen isotope molecule) obtained by means of isotope exchange by means of the isotope scrambler 47 is determined according to the abundance ratio of each isotope in the introduction oxygen 115.

In other words, for example, the components of $^{16}O^{16}O$, $^{16}O^{17}O$, and $^{16}O^{18}O$ are present in the introduction oxygen 115. If the respective molar ratios of these components is $Y_{11}$, $Y_{12}$, and $Y_{13}$, the combination of oxygen atoms which make up the oxygen molecules changes randomly based on the abundance probability of each of the isotopes by means of the isotope scrambler 47 using either of the above described methods, the concentration of each component after the isotope scrambling is as follows.

$^{16}O^{16}O : (Y_{11} + Y_{12}/2 + Y_{13}/2)^2$     (i)

$^{16}O\ ^{17}O : (Yn + Y_{12}/2 + Y_{13}/2)Y_{12}$     (ii)

$^{16}O^{18}O : (Y_{11} + Y_{12}/2 + Y_{13}/2)Y_{13}$     (iii)

$^{17}O^{17}O : Y^2_{12}/4$     (iv)

$^{17}O^{18}O : Y_{12}Y_{13}/2$     (v)

$^{18}O^{18}O : Y^2_{13}/4$     (vi)

A part of the $^{16}O$ which is contained in the $^{16}O^{17}O$ and $^{16}O^{18}O$ becomes $^{16}O^{16}O$, and accompanying this the concentration of oxygen molecules ($^{18}O^{18}O$, $^{17}O^{18}O$ and $^{17}O\ ^{17}O$, hereinafter referred to as heavy oxygen molecules) consisting of the heavy components ($^{17}O$ and $^{18}O$) increases.

The reaction product in which the concentration of heavy oxygen molecules has been increased using the isotope scrambler 47 is supplied to column $A_i$ through conduit 49 as isotope scrambler return oxygen 116, and thereafter passes through columns $A_i$ to $A_n$.

The heavy oxygen molecules have a higher boiling point and are easily enriched. Therefore, the concentration of heavy oxygen isotopes is further increased in this process.

In the enrichment method of oxygen isotopes of the above-described embodiment, it is possible to shorten the start-up time in the same way as in the above-described first embodiment.

In addition, the heavy oxygen isotope enriched material obtained by means of columns $A_1$ to $A_h$ is supplied to the isotope scrambler 47, the concentration of heavy oxygen molecules within the enriched material is increased by means of isotope scrambling which occurs in the isotope scrambler 47, the enriched material is then supplied to the columns $A_i$ to $A_n$, and the concentration of heavy oxygen isotopes is further increased. Therefore, it is possible to obtain a product containing a high concentration of heavy oxygen isotopes.

In addition, the apparatus shown in the figure has a structure in which the conduit 49 on the outlet side of the isotope scrambler 47 is connected to the $i^{th}$ column $A_i$. In this way, the column to which the conduit 49 on the outlet side of the isotope scrambler 47 is connected is preferably further down stream (to the later stage side) from the $h^{th}$ column $A_h$ to which the conduit 48 on the inlet side of the isotope scrambler 47 is connected. However, the present invention is not limited to this, and the column to which the outlet side conduit 49 is connected may be the column to which the inlet side conduit 48 is connected or may be upstream (to the earlier stage side) from that column.

In other words, the isotope scrambler 47 can be inserted at any part of "the apparatus constructed from a plurality of distillation columns" which is constructed in a cascade. For example, it is possible to draw off vapor from any place of the $k^{th}$ column (including the distillation column, the condenser, the reboiler, the piping, etc.) process it in the isotope scrambler, and return it to any place of the $j^{th}$ column (including the distillation column, the condenser, the reboiler, the piping, etc.). Here, the size relationship between k and j is unrestricted, and it is also possible for the k and j to be equal. However, in order for the isotope scrambling to be conducted efficiently, the place at which the vapor is extracted from the apparatus is preferable a position at which $^{16}O^{18}O$ is most enriched. In addition, it is preferable for the position to which the oxygen is returned to the distillation column after isotope scrambling to be at a later stage (location at which the $^{18}O^{18}O$ is more enriched) than the place of extraction, because the concentration of $^{18}O^{18}O$ in the oxygen after the isotope scrambling is greater than the concentration of the isotope $^{18}O^{18}O$ at the position of extraction.

In addition, in the present invention, it is possible to obtain heavy oxygen water by means of supplying oxygen extracted from the above mentioned final column $A_n$ to the above mentioned hydrogenation reaction apparatus 300, and converting it to water.

Next, the results of computer simulations for situations in which enrichment in heavy oxygen isotopes was conducted using each of the above-mentioned apparatuses will be explained.

The distillation theory employed in designing the distillation column according to the present invention and the distillation theory employed in this simulation use a rate model relating to mass transfer, in which the so-called H.E.T.P. (Height Equivalent to a Theoretical Plate) or equilibrium stage model were not used.

In the distillation theory using this rate model, the mass flux N is expressed in the following way using the diffusion flux J and convection p v.

$$N = J_{GS} + p_{GS} v_{GS} \omega_{GS}$$

In addition, as the formula for the correlation related to mass transfer, it is possible to give the following.

$$Sh_{GS}(J_{GS}/N) = A_1 Re_G^{A2} \cdot Sc_{GS}^{A3}$$

wherein Sh, Re, and Sc are respectively defined by the following formulae.

$$SH_{GS} = Nd/p_{GS} D_{GS} \Delta \omega_{GS})$$

$$Re_G = p_G U_G d/\mu_G$$

$$Sc_{GS} = \mu_{GS}/(p_{GS} D_{GS})$$

N: mass flux [kg/(m²−s)]
J: diffusion flux [kg/(m²−s)]
d: equivalent diameter [m]
D: diffusion coefficient [m²/s]
p: density [kg/m³]
v: velocity [m/s]
ω: concentration [kg/kg]
Sh: Sherwood number [−]
Re: Reynolds number [−]
Sc: Schmidt number [−]
subscript G: vapor phase
subscript S: vapor-liquid interface The advantages with this rate model are that it is possible to correctly predict the mass transfer of an intermediate component within a multi-component system, and it does not give unrealistic results such as the negative values obtained with H.E.T.P. or Murphree's plate efficiency which occur when making calculations by means of the equilibrium stage model.

The aforementioned model is disclosed in detail in J. A. Wesselingh: "Non-equilibrium modeling of distillation" IChemE Distillation and Absorption '97, vol. 1. pp. 1-21 (1997).

EXAMPLE 1

Table 2 shows the results of a simulation conducted using the above-mentioned model for a situation in which enrichment in oxygen isotopes was carried out using the enrichment apparatus shown in FIG. 1. The specifications for the apparatus are shown in Table 1.

CONVENTIONAL EXAMPLE 1

Figure 19:
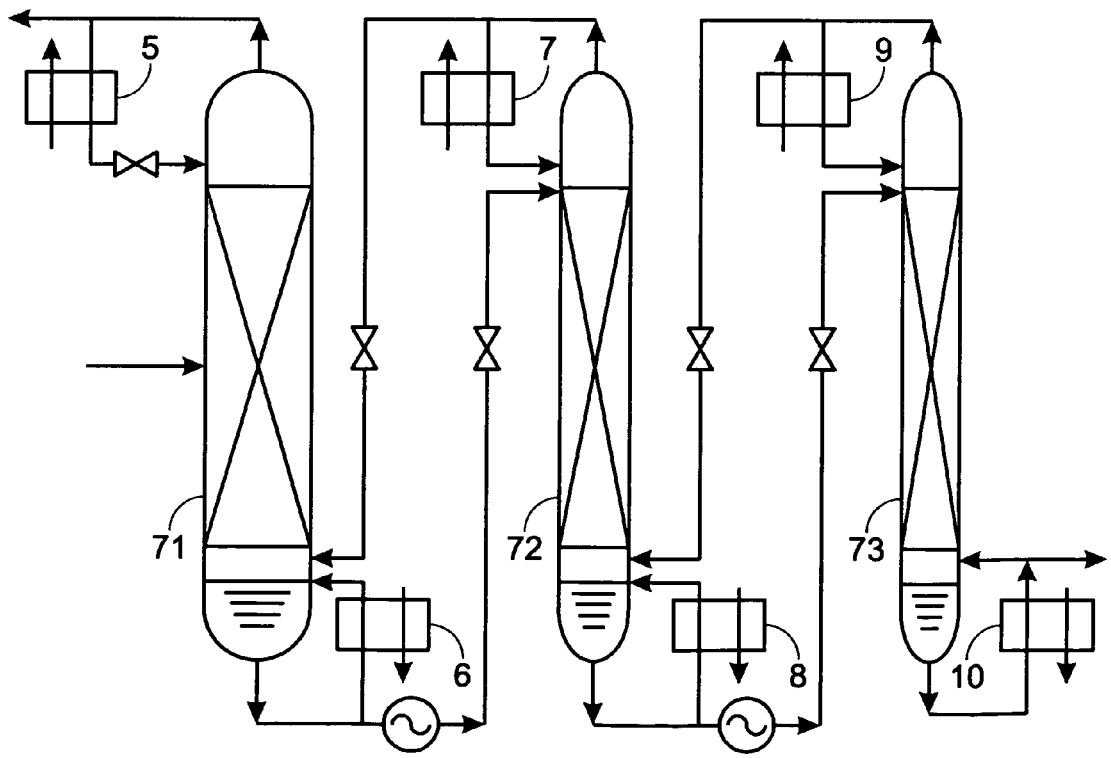
FIG. 19 is a schematic structural diagram showing another prior art example of a conventional apparatus.

The results of a simulation conducted for a situation in which the enrichment in oxygen isotopes was carried out using the conventional apparatus shown in FIG. 19 are shown together in Table 2.

In this conventional apparatus the diameter of the first through third columns and the packing height were assumed to be the same as in the apparatus of Example 1. In addition, the amount of feed, the amount of product, the reflux ratio, and the like were also given the same values as for Example 1.

TABLE 1

|  | First Column | Second Column | Third Column |
|---|---|---|---|
| Packing height (m) | 150 | 150 | 150 |
| Internal diameter of Column (m) | 0.4 | 0.2 | 0.08 |
| Specific surface area of packing (m²/m³) | 500 | 500 | 500 |

TABLE 2

|  |  | Conventional Example 1 | Example 1 |
|---|---|---|---|
| First Column |  |  |  |
| Condenser | Amount of heat exchange (kW) | 109.6 | 109.6 |
| Feed | Flow rate (mol/s) | 1.0 | 1.0 |
|  |  | (vapor) | (vapor) |
|  | Pressure (kPa) | 120 | 120 |
|  | $^{16}O^{18}O$ concentration (ppm) | 4070 | 4070 |
| Ascending vapor | Flow rate (mol/s) | 16.4 | 16.4 |
| Reboiler | Amount of heat exchange (kW) | 106.0 | 113.2 |

TABLE 2-continued

| | | Conventional Example 1 | Example 1 |
|---|---|---|---|
| Second Column | | | |
| Condenser | Amount of heat exchange (kW) | 24.2 | 31.7 |
| Feed | Flow rate (mol/s) | 0.53 (liquid) | 0.53 (vapor) |
| | Pressure (kPa) | 156 | 120 |
| | $^{16}O^{18}O$ concentration (%) | 2.29 | 2.01 |
| Ascending vapor | Flow rate (mol/s) | 4.2 | 4.2 |
| Reboiler | Amount of heat exchange (kW) | 27.2 | 28.6 |
| Third Column | | | |
| Condenser | Amount of heat exchange (kW) | 3.8 | 5.0 |
| Feed | Flow rate (mol/s) | 0.084 (liquid) | 0.084 (vapor) |
| | Pressure (kPa) | 193 | 122 |
| | $^{16}O^{18}O$ concentration (%) | 16.9 | 15.2 |
| Ascending vapor | Flow rate (mol/s) | 0.668 | 0.668 |
| Column bottom product | Flow rate (mol/s) | $4.0 \times 10^{-4}$ (vapor) | $4.0 \times 10^{-4}$ (vapor) |
| | Pressure (kPa) | 230 | 160 |
| | $^{16}O^{18}O$ Concentration (—) | 65.0 | 67.6 |
| Reboiler | Amount of heat exchange (kW) | 4.4 | 4.5 |
| $^{16}O^{18}O$ hold-up | | | |
| Packing layer/condenser/reboiler (mol) | | 865 | 803 |
| Liquid supply piping (mol) | | 109 | 2.2 |
| Total (mol) | | 974 | 805 |
| Start-up Time (days) | | 39 | 30 |

From Table 2 it can be seen that the concentration of $^{16}O^{18}O$ in the product is higher for the method of Example 1 in which the apparatus of FIG. 1 was used than in the method of Conventional Example 1 in which a conventional apparatus was used.

This can be considered to be due to the fact that it is possible for the situation in Example 1 to reduce the pressure within the columns compared with Conventional Example 1, and as a result it is possible to increase the relative vapor pressure of each of the components within the column and to improve the efficiency of the distillation.

In addition, from Table 2, it can be seen that it is possible to shorten the start-up time of the apparatus. This is considered to be due to the following reasons.

In Conventional Example 1, almost all of the sections of the piping which are the liquid supply conduits between the first column and the second column and between the second column and the third column are full of liquid. In contrast, in Example 1, of the piping (return conduits 14 and 15) which are the liquid supply conduits from the second column to the first column and from the third column to the second column, only a few sections which correspond to the liquid head portion corresponding to the pressure difference for the bottom of the column and the top of the column between the first column and the second column, and between the second column and the third column are full of liquid.

For this reason, in Example 1, it is possible for the amount of liquid hold-up to be reduced, and for the start-up time to be shortened.

When Example 1 and Conventional Example 1 are compared, it was possible to obtain an overwhelmingly superior result for the liquid hold-up of the $^{16}O^{18}O$ component within the liquid supply piping for Example 1 over Conventional Example 1. In particular, when the column diameter is smaller than in Example 1 and Conventional Example 1, since the relative size of the diameter of the liquid supply piping can be considered to be larger, it is considered that the difference in the liquid hold-up of the whole apparatus between the apparatus of the present invention and the conventional apparatus will become greater, and that the superiority of the apparatus of the present invention with regard to the point of start-up time will be even more obvious.

In addition, the amount of liquid hold-up of the $^{16}O^{18}O$ component compared with Example 1 is considered to reach as much as three times or greater for a situation in which enrichment of oxygen isotopes is conduced using a distillation column in which unstructured packing is used instead of the structured packing used in Example 1. Compared with an amount for the liquid hold-up of 2 to 3% of the volume of the packing layer for structured packing, the amount for the liquid hold-up for unstructured packing is considered to be 10 to 20%.

In this way, since it is possible to reduce the amount of liquid hold-up when using structured packing, it is possible to greatly shorten the start-up time.

In addition, since a liquid pump is not used in the method of this Example 1, the power for operating such a pump is not required.

The following are other advantages that result from not using a liquid pump.

(1) There are reductions in apparatus/machinery costs (2) There is no need to perform maintenance on liquid pumps, or to switch backup liquid pumps associated therewith, and therefore it is possible for stable and continuous operation.

(3) It is possible to reduce operation costs for the liquid pump.

(4) It is possible to reduce operation costs for supplemental cooling (such as a nitrogen cycle) due to the need to reduce heat loss resulting from the liquid pump.

On the other hand, the amount of heat exchange for the condensers and the reboilers is greater in the present embodiment than in the conventional example and this is disadvantageous from the point of view of operation cost. This is because in the present invention the liquid which was the feed from the first column to the second column and from the second column to the third column in conventional apparatuses is vaporized once in the reboiler, and thereafter, liquefied in the condenser. In addition, the vapor which was returned from the second column to the first column and from the third column to the second column in conventional apparatuses is liquefied once in the condenser and thereafter vaporized in the reboiler in the present invention.

This point is the cost of obtaining the advantages of the present invention that liquid pumps are unnecessary and that the pressure at the tops of the columns is reduced, and when a comparison is made with the conventional method which makes use of liquid pumps, this disadvantage is very small when compared with the advantages obtained by the present invention.

EXAMPLE 2

Table 4 shows the results of a simulation for a situation of producing heavy oxygen water using water as a starting material and using the apparatus shown in FIG. 1. The specifications for the apparatus are shown in Table 3.

CONVENTIONAL EXAMPLE 2

The results of a simulation conducted for a situation of producing heavy oxygen water using water as a starting material was carried out using the conventional apparatus shown in FIG. 19 are shown together in Table 4.

In this Conventional Example 2 the diameter of the first through third columns and the packing height, the amount of feed, the amount of product, the reflux ratio, and the like had the same values as for Example 2.

TABLE 3

|  | First Column | Second Column | Third Column |
|---|---|---|---|
| Packing height (m) | 100 | 100 | 100 |
| Internal diameter of Column (m) | 0.1 | 0.08 | 0.06 |
| Specific surface area of the packing ($m^2/m^3$) | 500 | 500 | 500 |

TABLE 4

|  |  | Conventional Example 2 | Example 2 |
|---|---|---|---|
| First Column |  |  |  |
| Condenser | Amount of heat exchange (kW) | 26.6 | 26.6 |
| Feed | Flow rate (mol/s) | 0.01 (vapor) | 0.01 (vapor) |
|  | Pressure (kPa) | 127 | 127 |
|  | $H_2^{18}O$ concentration (ppm) | 2040 | 2040 |
| Ascending vapor | Flow rate (mol/s) | 0.663 | 0.663 |
| Reboiler | Amount of heat exchange (kW) | 25.8 | 27.3 |
| Second Column |  |  |  |
| Condenser | Amount of heat exchange (kW) | 16.5 | 18.1 |
| Feed | Flow rate (mol/s) | 0.0184 (liquid) | 0.0184 (vapor) |
|  | Pressure (kPa) | 151 | 120 |
|  | $H_2^{18}O$ concentration (ppm) | 6640 | 6220 |
| Ascending vapor | Flow rate (mol/s) | 0.434 | 0.434 |
| Reboiler | Amount of heat exchange (kW) | 17.1 | 17.6 |

TABLE 4-continued

|  |  | Conventional Example 2 | Example 2 |
|---|---|---|---|
| Third Column |  |  |  |
| Condenser | Amount of heat exchange (kW) | 9.5 | 9.9 |
| Feed | Flow rate (mol/s) | 0.00417 (liquid) | 0.00417 (vapor) |
|  | Pressure (kPa) | 117 | 120 |
|  | $H_2^{18}O$ concentration (%) | 2.73 | 2.71 |
| Ascending vapor | Flow rate (mol/s) | 0.243 | 0.243 |
| Column bottom product | Flow rate (mol/s) | $2.0 \times 10^{-5}$ (vapor) | $2.0 \times 10^{-5}$ (vapor) |
|  | Pressure (kPa) | 200 | 152 |
|  | $H_2^{18}O$ Concentration (%) | 9.41 | 10.7 |
| Reboiler | Amount of heat exchange (kW) | 9.7 | 9.7 |
| hold-up |  |  |  |
| packing layer/condenser/reboiler (mol) |  | 40.9 | 42.3 |
| Liquid supply piping (mol) |  | 14.2 | 0.30 |
| Total (mol) |  | 55.1 | 42.6 |
| Start-up Time (days) |  | 303 | 206 |

From Table 4, it can be seen that the concentration of $H_2^{18}O$ in the product is higher for the method of Example 2 in which the apparatus of FIG. 1 was used when compared to the method of Conventional Example 2 in which a conventional apparatus was used. In addition, it can be seen that the amount of liquid hold-up is reduced and that it is possible to shorten the start-up time of the apparatus.

EXAMPLE 3

Table 7 shows the results of a simulation for a situation of producing heavy oxygen water using the apparatus shown in FIG. 12. The oxygen distillation column unit $F_1$ has ten distillation columns, and the water distillation column unit $F_2$ has five distillation columns. The specifications for the oxygen distillation column unit $F_1$ are shown in Table 5, and the specifications for the water distillation column unit $F_2$ are shown in Table 6.

TABLE 5

|  | Column number | | | | | | | | | |
|---|---|---|---|---|---|---|---|---|---|---|
|  | 1 | 2 | 3 | 4 | 5 | 6 | 7 | 8 | 9 | 10 |
| Height (m) | 50 | 50 | 50 | 50 | 50 | 50 | 50 | 50 | 50 | 50 |
| Internal diameter of column (m) | 0.7 | 0.5 | 0.4 | 0.3 | 0.25 | 0.20 | 0.15 | 0.10 | 0.05 | 0.05 |
| Specific surface area of packing ($m^2/m^3$) | 500 | 500 | 500 | 500 | 500 | 500 | 500 | 500 | 500 | 500 |
| Pressure at top of column (kPa) | 120 | 120 | 120 | 120 | 120 | 120 | 120 | 120 | 120 | 120 |
| Pressure at bottom of column (kPa) | 130 | 130 | 130 | 130 | 130 | 130 | 130 | 130 | 130 | 130 |
| Amount of heat exchange in condenser (kW) | 304.3 | 179.1 | 112.6 | 62.7 | 42.1 | 26.1 | 14.3 | 6.4 | 1.8 | 1.7 |
| Amount of heat exchange in reboiler (kW) | 328.2 | 168.5 | 106.2 | 59.3 | 40.2 | 25.2 | 13.9 | 6.2 | 1.7 | 1.5 |

TABLE 6

| | Column number | | | | |
|---|---|---|---|---|---|
| | 1 | 2 | 3 | 4 | 5 |
| Height (m) | 50 | 50 | 50 | 50 | 50 |
| Internal diameter of column (m) | 90 | 75 | 60 | 50 | 40 |
| Specific surface area of packing (m$^2$/m$^3$) | 500 | 500 | 500 | 500 | 500 |
| Pressure at top of column (kPa) | 120 | 120 | 120 | 120 | 120 |
| Pressure at bottom of column (kPa) | 130 | 130 | 130 | 130 | 130 |
| Amount of heat exchange in condenser (kW) | 18.8 | 13.3 | 8.5 | 5.9 | 3.8 |
| Amount of heat exchange in reboiler (kW) | 19.2 | 13.2 | 8.4 | 5.9 | 3.6 |

TABLE 7

| Oxygen distillation Column | Feed vapor | Flow rate | 1.0 mol/s |
|---|---|---|---|
| | | $^{16}O^{18}O$ concentration | 4070 ppm |
| | | ($^{18}O$ atomic fraction) | 2040 ppm |
| | Intermediate product vapor | flow rate | 4.0 × 10$^{-4}$ (vapor) |
| | | $^{16}O^{18}O$ concentration | 95.9% |
| | | ($^{18}O$ atomic fraction) | 48.3% |
| | | $^{16}O^{18}O$ hold-up | 2550 mol |
| | Start-up time | | 71 days |
| Water distillation Column | Feed vapor | Flow rate | 8.0 × 10$^{-4}$ (vapor) |
| | | $H_2^{18}O$ concentration | 48.3% |
| | | ($^{18}O$ atomic fraction) | 48.3% |
| | Product vapor | flow rate | 1.0 × 10$^{-4}$ (vapor) |
| | | $H_2^{18}O$ concentration | 97.2% |
| | | ($^{18}O$ atomic fraction) | 97.2% |

TABLE 7-continued

| | | $H_2^{18}O$ hold-up | 948 mol |
|---|---|---|---|
| | Start-up time | | 68 days |

From Table 7 it can be seen that it was possible to obtain heavy oxygen water enriched to 97% or greater in a heavy oxygen isotope ($^{18}O$).

In this Example 3, it is possible to produce an amount of approximately 60 kg per year. The start-up time for the apparatus including both the distillation column unit $F_1$ for oxygen enrichment and the distillation column unit $F_2$ for water distillation was approximately 140 days.

As an example in which enrichment of heavy oxygen isotopes ($^{18}O$) is conducted using water distillation as in this Example 3, there is the example reported by Thode, Smith, and Walking: Canad. J. Res. 22, 127 (1944) as recited in U.S. Pat. No. 5,057,225. For this example, it was reported that 150 g of water in which the heavy oxygen isotope ($^{18}O$) was enriched to 1.3%0 by means of a cascade process comprising three distillation columns.

In this conventional example, the time required for start-up was 120 days. In consideration of productivity, it is clear from Example 3 that it is possible to greatly shorten the start-up time compared with conventional technology.

EXAMPLE 4

Table 9 shows the results of a simulation for a situation in which enrichment in heavy oxygen isotopes ($^{18}O$) is conducted using the apparatus shown in FIG. 14.

Figure 16:
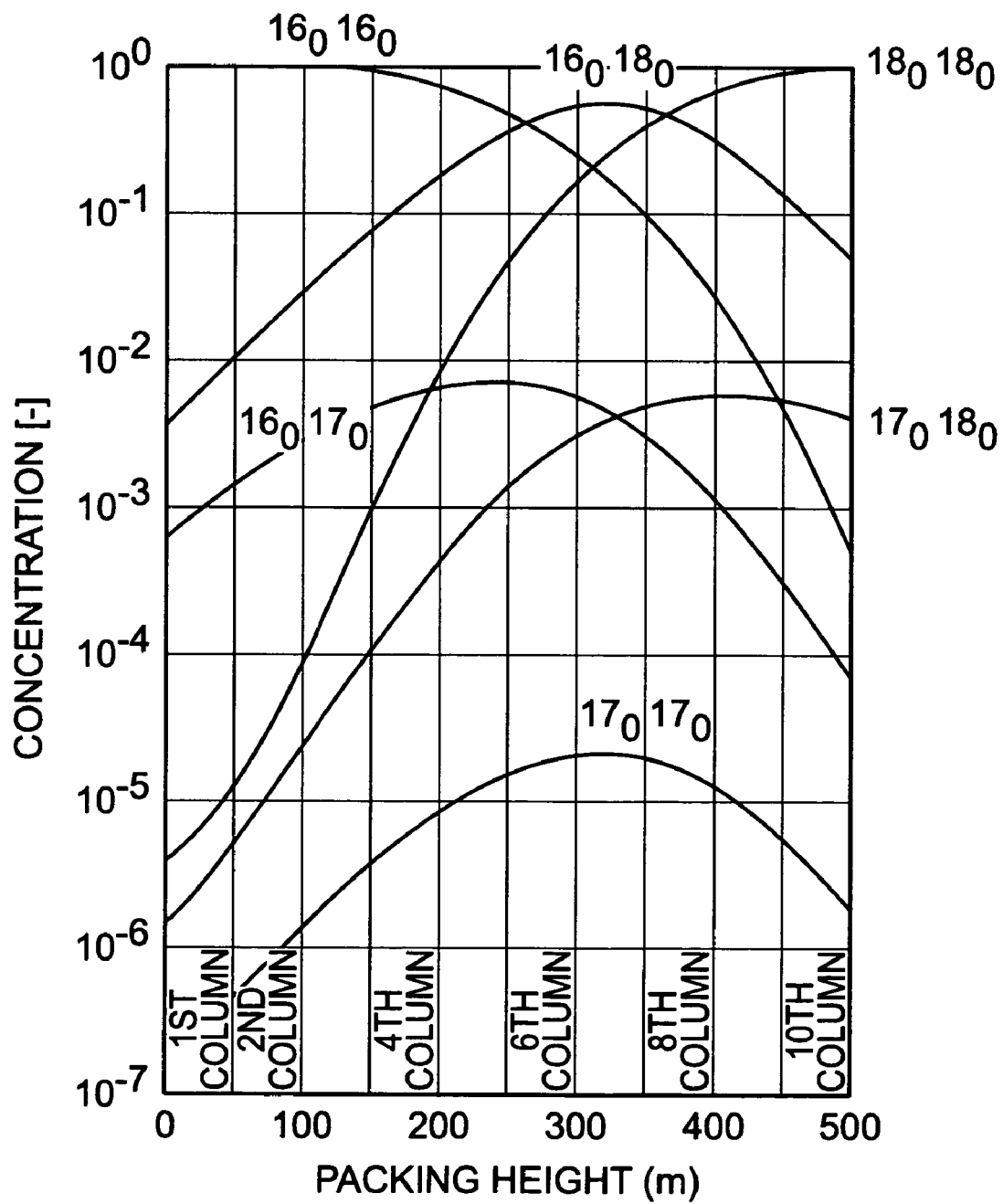
FIG. 16 is a graph showing the results of a simulation of the enrichment of heavy oxygen isotopes for a case in which the apparatus shown in FIG. 14 is used as an example, and shows the concentration distribution for each isotope within each column. In this graph, the horizontal axis shows the total packing height, and the vertical axis shows the concentration of each isotope.

In addition, FIG. 16 shows the concentration distribution for each isotope within each column.

It was assumed that the number (n) of distillation columns was 10 and the isotope scrambler 47 was arranged between the sixth column and the seventh column. The specifications of the apparatus are shown in Table 8. In the table, the isotope scrambler supply vapor indicates the introduction oxygen 115 which is supplied to the isotope scrambler 47 through the conduit 48, and the isotope scrambler return vapor indicates the isotope scrambler return oxygen 116 which is drawn off from the isotope scrambler 47 and supplied to column $A_j$ through conduit 49.

TABLE 8

| | Column number | | | | | | | | | |
|---|---|---|---|---|---|---|---|---|---|---|
| | 1 | 2 | 3 | 4 | 5 | 6 | 7 | 8 | 9 | 10 |
| Height (m) | 50 | 50 | 50 | 50 | 50 | 50 | 50 | 50 | 50 | 50 |
| Internal diameter of column (m) | 230 | 170 | 120 | 88 | 64 | 47 | 34 | 25 | 18 | 13 |
| Specific surface area of packing (m$^2$/m$^3$) | 500 | 500 | 500 | 500 | 500 | 500 | 500 | 500 | 500 | 500 |
| Pressure at top of column (kPa) | 120 | 120 | 120 | 120 | 120 | 120 | 120 | 120 | 120 | 120 |
| Pressure at bottom of column (kPa) | 130 | 130 | 130 | 130 | 130 | 130 | 130 | 130 | 130 | 130 |
| Amount of heat exchange in condenser | 36.24 | 21.82 | 10.19 | 5.40 | 2.82 | 1.50 | 0.77 | 0.40 | 0.21 | 0.11 |
| Amount of heat exchange in reboiler | 38.14 | 20.19 | 10.00 | 5.35 | 2.81 | 1.50 | 0.76 | 0.40 | 0.21 | 0.10 |

TABLE 9

| Oxygen Distillation Column | Feed vapor | Flow rate | 0.3 mol/s |
|---|---|---|---|
| | | $^{16}O^{18}O$ concentration | 4070 ppm |
| | | $^{18}O^{18}O$ concentration | 4.2 ppm |
| | | ($^{18}O$ atomic fraction) | 2040 ppm |
| | Isotope scrambler supply vapor | flow rate | 6.0 × 10$^{-4}$ mol |
| | | $^{16}O^{18}O$ concentration | 51.4% |
| | | $^{18}O^{18}O$ concentration | 16.2% |
| | | ($^{18}O$ atomic fraction) | 42.1% |
| | Isotope scrambler return vapor | flow rate | 6.0 × 10$^{-4}$ mol |
| | | $^{16}O^{18}O$ concentration | 48.3% |
| | | $^{18}O^{18}O$ concentration | 17.7% |
| | | ($^{18}O$ atomic fraction) | 42.1% |
| | Product vapor | flow rate | 1.0 × 10$^{-5}$ mol |
| | | $^{16}O^{18}O$ concentration | 5.5% |

TABLE 9-continued

| | | |
|---|---|---|
| | $^{18}O^{18}O$ concentration | 94.1% |
| | ($^{18}O$ atomic fraction) | 97.0% |
| $^{16}O^{18}O$ hold-up | | 222 mol |
| $^{18}O^{18}O$ hold-up | | 55 mol i |
| Start-up time | | 73 days |

From Table 9, it is clear that it is possible to obtain an enriched material which has been enriched to 97% or greater heavy oxygen isotopes ($^{18}O$) by means of Example 4.

In Example 4, it can be seen that it is possible to produce an amount of approximately 12 kg per year, and that the start-up time for the apparatus is 73 days.

In the apparatus shown in the present embodiment, the flow rate of $^{18}O^{18}O$ accompanying the product vapor is:

[flow rate of product vapor]×[concentration of $^{18}O^{18}O$ within the product vapor]=1×10$^{-5}$ (mol/s)× 0.941=9.4×10$^{-6}$ (mol/s)

On the other hand, the flow rate of $^{18}O^{18}O$ supplied to the apparatus accompanying the feed vapor is:

(flow rate of feed vapor)×[concentration of $^{18}O^{18}O$ within the feed vapor]=0.3 (mol/s)×4.2×10$^{-6}$=1.3×10$^{-6}$ (mol/s)

This is much less than the flow rate of $^{18}O^{18}O$ which accompanies the product vapor.

The isotope scrambler in the present embodiment is provided to compensate for the scarcity of the above-mentioned $^{18}O^{18}O$. More specifically, by means of treating in the isotope scrambler the enriched oxygen vapor enriched to a high concentration (preferably to 45% or greater) of $^{16}O^{18}O$ within the distillation column, new $^{18}O^{18}O$ is generated, and by returning this to the distillation column again, it is possible to collect a larger amount of $^{18}O^{18}O$ than the amount of $^{18}O^{18}O$ supplied with the feed vapor. As it is clear from Table 9, in the present embodiment, the amount of $^{18}O^{18}O$ produced by means of the isotope scrambling is shown by the following formula.

$$[\text{amount treated by the isotope scrambler}] \times ([\text{concentration of } ^{18}O^{18}O \text{ at the outlet}] - [\text{concentration of } ^{18}O^{18}O \text{ at the inlet}]) = 6.0 \times 10^{-4} \times$$

-continued
$$[0.177 - 0.162]$$
$$= 9.0 \times 1.6^{-6} \text{ (mol/s)}$$

If this is combined with the 1.3×10$^{-6}$ (mol/s) of $^{18}O^{18}O$ supplied by means of the feed vapor, the total amount of $^{18}O^{18}O$ supplied to the distillation column is 10.3×10$^{-6}$ (mol/s). Therefore, it is possible to collect the above-mentioned $^{18}O^{18}O$ of 9.4×10$^{-6}$ (mol/s) in the product.

If an isotope scrambler were not provided, the amount of feed vapor would have to be increased by at least 7.2 (i.e. (9.4×10$^{-6}$)/(1.3×10$^{-6}$)) times and, associated with this, it would be necessary for the distillation columns to have larger diameters. This would not be desirable from the point of view of hold-up and start-up time. In other words, by means of the provision of the isotope scrambler in the apparatus shown in the present embodiment, it is possible to collect a product enriched in heavy oxygen isotopes using an apparatus which has a column diameter smaller than in the past.

EXAMPLE 5

FIG. 10 shows the results of a simulation of the distillation of stable oxygen isotopes using an apparatus in which the number of distillation columns has been increased to 16, and using exactly the same process as the apparatus of FIG. 1. The specifications for this apparatus are shown in Table 11.

TABLE 10

| | | |
|---|---|---|
| Feed (liquid) | flow rate (mol/s) | 0.1 |
| | $^{16}O^{17}O$ concentration ($^{17}O$ atomic fraction) ppm | 738 (370) |
| | $^{16}O^{18}O$ concentration ($^{18}O$ atomic fraction) ppm | 4070 (2040) |
| Product vapor 1 (collected at bottom of 11$^{th}$ column) | Flow rate (mol/s) | 8.0 × 10$^{-6}$ |
| | $^{16}O^{17}O$ concentration ($^{17}O$ atomic fraction) % | 49.6 (24.8) |
| | $^{16}O^{18}O$ concentration ($^{18}O$ atomic fraction) % | 36.7 (18.4) |
| Product vapor 2 (collected at bottom of 16$^{th}$ column) | flow rate (mol/s) | 1.65 × 10$^{-4}$ |
| | $^{16}O^{17}O$ concentration ($^{17}O$ atomic fraction) % | 3.8 (1.9) |
| | $^{16}O^{18}O$ concentration ($^{18}O$ atomic fraction) % | 96.0 (48.2) |

*The feed was supplied to the first column.

TABLE 11

| | Column Number | | | | | | | |
|---|---|---|---|---|---|---|---|---|
| | 1 | 2 | 3 | 4 | 5 | 6 | 7 | 8 |
| Height (m) | 80 | 80 | 80 | 80 | 80 | 80 | 80 | 80 |
| Internal diameter of column (mm) | 320 | 320 | 320 | 320 | 240 | 240 | 180 | 180 |
| Specific surface area of packing (m$^2$/m$^3$) | 500 | 500 | 500 | 500 | 500 | 500 | 500 | 500 |
| Pressure at top of column (kPa) | 120 | 120 | 120 | 120 | 120 | 120 | 120 | 120 |
| Pressure at bottom of column (kPa) | 140 | 140 | 140 | 140 | 140 | 140 | 140 | 140 |
| Amount of heat exchange in condenser (kW) | 65.15 | 73.18 | 73.53 | 72.57 | 41.25 | 40.59 | 22.92 | 22.22 |
| Amount of heat exchange in reboiler (kW) | 73.31 | 73.54 | 72.58 | 69.98 | 40.61 | 39.09 | 22.28 | 21.36 |

TABLE 11-continued

| | Column Number | | | | | | | |
|---|---|---|---|---|---|---|---|---|
| | 9 | 10 | 11 | 12 | 13 | 14 | 15 | 16 |
| Height (m) | 80 | 80 | 80 | 80 | 80 | 80 | 80 | 80 |
| Internal diameter of column (mm) | 130 | 130 | 100 | 100 | 72 | 72 | 55 | 55 |
| Specific surface area of packing ($m^2/m^3$) | 500 | 500 | 500 | 500 | 500 | 500 | 500 | 500 |
| Pressure at top of column (kPa) | 120 | 120 | 120 | 120 | 120 | 120 | 120 | 120 |
| Pressure at bottom of column (kPa) | 140 | 140 | 140 | 140 | 140 | 140 | 140 | 140 |
| Amount of heat exchange in condenser (kW) | 11.42 | 10.95 | 6.36 | 6.23 | 3.21 | 3.19 | 1.86 | 1.86 |
| Amount of heat exchange in reboiler (kW) | 11.05 | 10.76 | 6.29 | 6.20 | 3.20 | 3.18 | 1.86 | 1.83 |

The present embodiment has the object of obtaining a product which is enriched in the intermediate component of $^{16}O^{17}O$, and is a case in which the total height of the distillation column has been increased.

Figure 17:
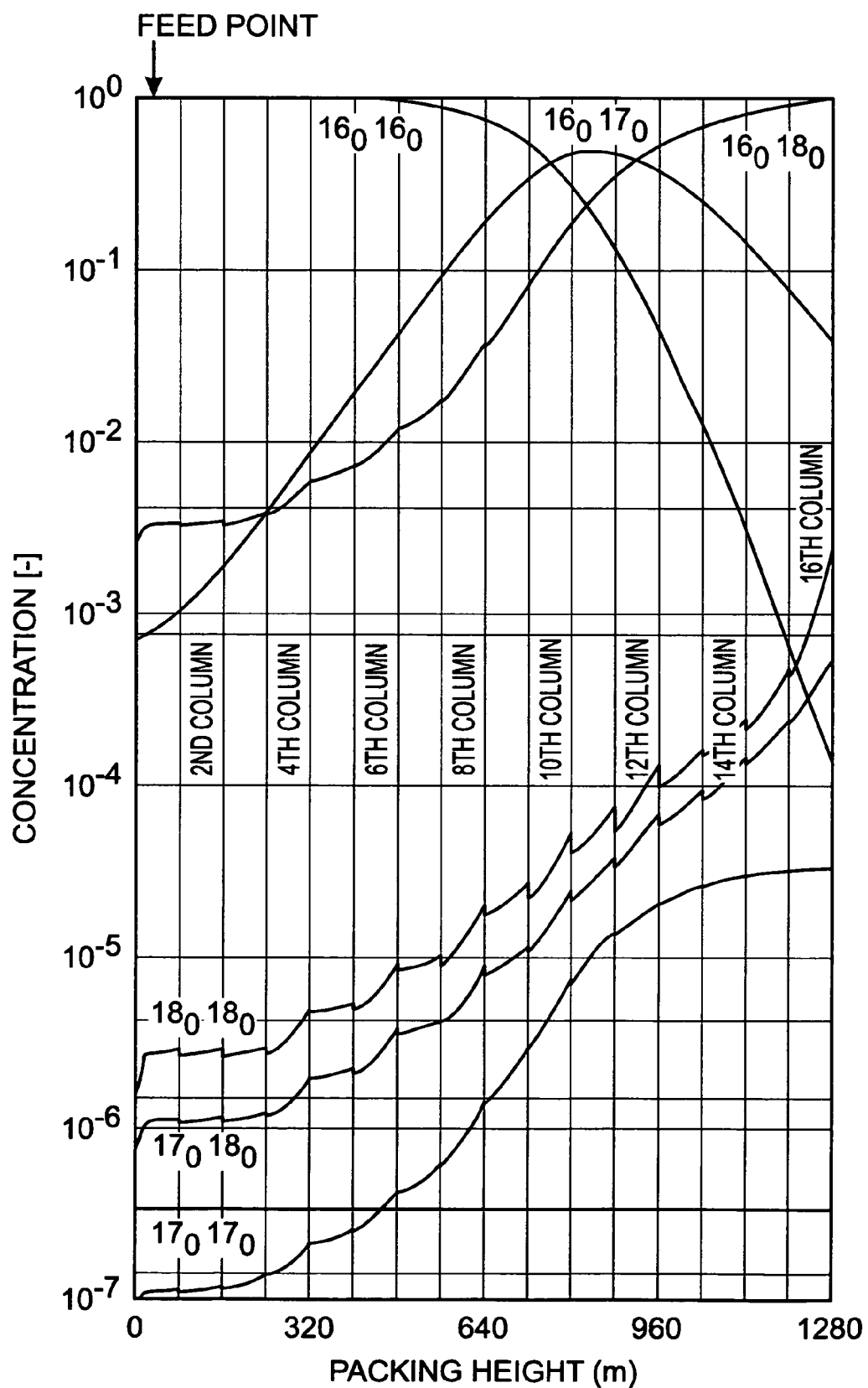
FIG. 17 is a graph showing the results of a simulation of the enrichment of heavy oxygen isotope for a case in which an apparatus is used which employs the same structure as the apparatus shown in FIG. 1 with the exception that the number of distillation columns is 16, as an example. This graph shows the concentration distribution for each isotope with each column. In this graph, the horizontal axis shows the total packing height, and the vertical axis shows the concentration distribution for each isotope.
Figure 18:
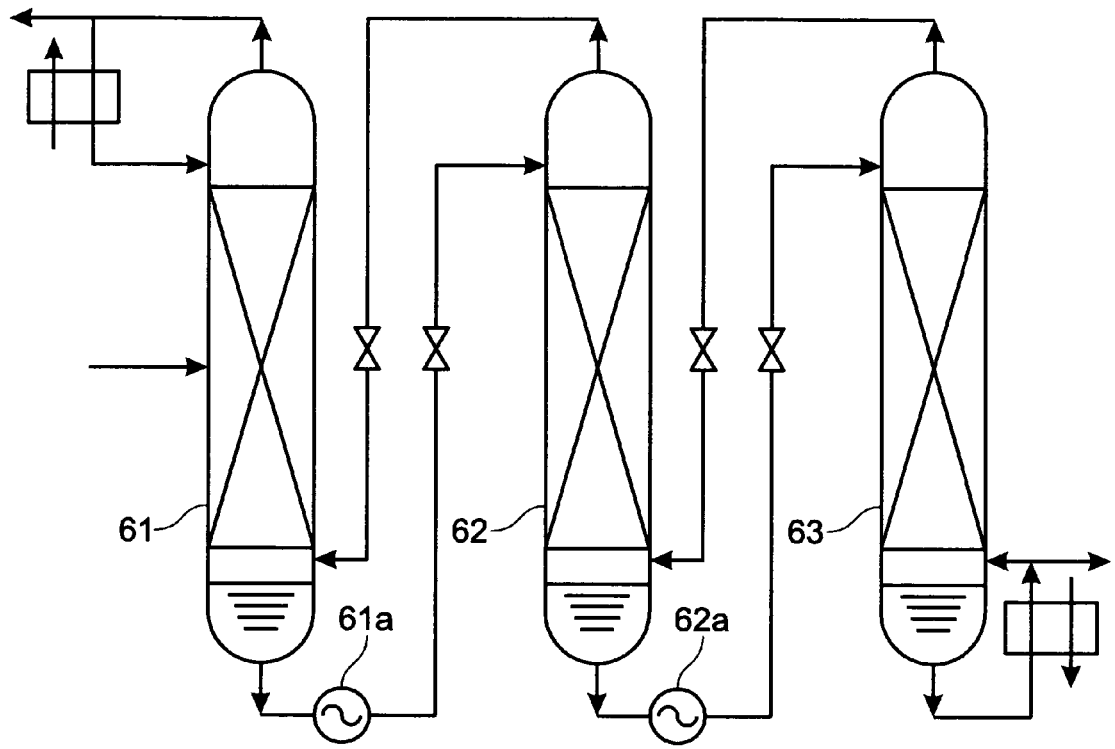
FIG. 18 is a schematic structural diagram showing a prior art example of a conventional apparatus.

FIG. 17 shows a composition distribution for each of the oxygen isotopes within the column and, in this embodiment, a peak of the $^{16}O^{17}O$ is apparent in the vicinity of the tenth to twelfth columns, therefore, it is possible to obtain a $^{16}O^{17}O$ enriched product by means of collecting vapor liquid from at least one place in these columns.

In this example, vapor is collected from the bottom (the outlet of the reboiler) of the eleventh column as product vapor 1. In addition, vapor drawn off from the bottom of the sixteenth column is collected as product vapor 2.

In this example, the concentration of $^{16}O^{17}O$ in product 1 is approximately 50%, however, if the total height of the distillation column is increased further, it is possible to obtain further enriched $^{16}O^{17}O$.

In the present example, oxygen which has been purified to 99.999% or greater is supplied to the first column as feed. The amount of $^{16}O^{17}O$ in the feed is 738 ppm. and the amount of $^{16}O^{18}O$ is 4070 ppm.

The product vapor 1 is collected form the bottom of the eleventh column. If this product vapor 12 is processed in a hydrogenation apparatus in order to obtain water in its normal form, heavy oxygen water having a concentration of $^{17}O$ of approximately 25%.

Product vapor 2 is collected from the bottom of the sixteenth column. If this is processed in a hydrogenation apparatus, heavy oxygen water having a concentration of $^{18}O$ of approximately 48% is obtained.

When $^{17}O$ is not needed and only a product vapor which is enriched in $^{16}O^{18}O$ is required, a distillation column having a total height shorter than the present example can be used. In that case, the composition for the peak of $^{16}O^{17}O$ is approximately 1%. More specifically, if the composition distribution of $^{16}O^{18}O$ of FIG. 17 is considered, from the first column to the vicinity of the sixth column, the slope of the composition is small and, in order to enrich $^{16}O^{17}O$ to a high concentration, it is necessary to increase the total height beyond that necessary for $^{16}O^{18}O$ in the present example. In other words, if the total packing height is increased, it is possible to enrich the intermediate components using the apparatus of the present invention.

What is claimed is:

1. A method of producing heavy oxygen water, comprising:

obtaining an enriched material which has been enriched in at least one component from oxygen molecules which contain heavy oxygen isotopes by means of cryogenic distillation of an oxygen starting material which contains heavy oxygen isotopes using an apparatus for separation of a vapor or liquid mixtures;

wherein the apparatus comprises a plurality of distillation columns constructed in a cascade, each of the distillation columns including a reboiler and a condenser, so that liquid drawn from each of the columns is introduced into the reboiler, vapor drawn from each of the columns is introduced into the condenser;

an outlet of the reboiler of a first column is connected to an inlet of the condenser of a second column via introduction conduits, which introduce vapor drawn from the reboiler of the first column into the condenser of the second column; and an outlet of the condenser of the second column is connected to an inlet of the reboiler of the first column via return conduits, which return liquid drawn from the condenser of the second column into the reboiler of the first column;

obtaining water containing heavy oxygen water by adding hydrogen to said enriched material; and, thereafter, further enriching said heavy oxygen water using a separation apparatus.

2. A method of producing heavy oxygen water, comprising:

obtaining an enriched material which has been enriched in at least one component from oxygen molecules which contain heavy oxygen isotopes by means of cryogenic distillation of an oxygen starting material which contains heavy oxygen isotopes using an apparatus for separation of vapor or liquid mixtures;

wherein the apparatus comprises a plurality of distillation columns constructed in a cascade, each of the distillation columns including a reboiler and a condenser, liquid drawn from each of the columns being introduced into the reboiler, vapor drawn from each of the columns being introduced into the condenser;

an outlet of the reboiler of the first column is connected to the top of the second column via introduction conduits, which introduce vapor drawn from the reboiler of the first column into the second column; and an outlet of the condenser of the second column is connected to an inlet of the reboiler of the first column via return conduits, which return liquid drawn from the condenser of the second column into the reboiler of the first column;

obtaining water containing heavy oxygen water corresponding to said enriched material by adding hydrogen to said enriched material; and, thereafter, further enriching said heavy oxygen water using the separation apparatus.

3. A method of enrichment of oxygen isotopes in which an oxygen starting material containing heavy oxygen isotopes is enriched by means of a cascade process using a plurality of distillation columns, where each of the distillation columns includes a reboiler and a condenser, liquid drawn from each of the columns being introduced into the reboiler, vapor drawn from each of the columns being introduced into the condenser, the method comprising:

supplying at least a part of a vapor from a bottom of a first column or from an outlet of a reboiler of a first column to a second column;

returning at least a part of the liquid from a top of the second column or an outlet of the condenser of the second column to the first column; and carrying out enrichment in at least one of oxygen molecules selected from the group consisting of $^{16}O^{17}O$, $^{16}O^{18}O$, $^{17}O^{17}O$, $^{17}O^{18}O$, and $^{18}O^{18}O$, which contain heavy oxygen isotopes.

4. The method of claim 3, wherein the part of the vapor from the first column is supplied to the top of the second column, an inlet of a reboiler of the second column, the bottom of the second column, or a middle section of the second column.

5. The method of claim 3, wherein the part of the liquid from the second column is returned to an inlet of the reboiler of the first column, the bottom of the first column, or a middle section of the first column.

6. A method of enrichment of oxygen isotopes according to claim 3, further comprising converting the oxygen isotope-enriched material into water in the presence of hydrogen and an oxidation reaction catalyst, then electrolyzing the isotope-enriched water to produce hydrogen and oxygen having an even higher concentration of at least one oxygen molecule selected from the group consisting of $^{16}O$ $^{17}O$, $^{16}O$ $^{18}O$, $^{17}O$ $^{17}O$, $^{17}O$ $^{18}O$, and $^{18}O$ $^{18}O$.

7. The method of enrichment of oxygen isotopes according to claim 6, further comprising carrying out enrichment in at least one of oxygen molecules which contain heavy oxygen isotopes by means of conducting a method of enrichment according to claim 3 again on said enriched material to obtain an enriched product having an even higher concentration of at least one of said oxygen molecules which contain heavy oxygen isotopes.

8. A method of enrichment of oxygen water in which a water starting material containing heavy oxygen water is enriched by means of a cascade process using a plurality of distillation columns, where each of the distillation columns includes a reboiler and a condenser, liquid drawn from each of the columns being introduced into the reboiler, vapor drawn from each of the columns being introduced into the condenser, the method comprising:

supplying at least a part of the water vapor from a bottom of a first column or from an outlet of a reboiler provided in the vicinity of the bottom of the first column to a top of a second column, an inlet of a condenser provided in the vicinity of the top of the second column, or a middle section of the second column; and introducing at least a part of the liquid from the top of the second column or an outlet of a condenser of the second column to an inlet of a reboiler of the first column, the bottom of the first column, or the middle section of the first column.

* * * * *